(12) United States Patent
Lee et al.

(10) Patent No.: US 9,998,261 B2
(45) Date of Patent: Jun. 12, 2018

(54) METHOD BY WHICH MIMO TRANSMITTER FORMS RE GROUP

(71) Applicant: LG ELECTRONICS INC., Seoul (KR)

(72) Inventors: Kilbom Lee, Seoul (KR); Jiwon Kang, Seoul (KR); Kitae Kim, Seoul (KR); Heejin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

(21) Appl. No.: 15/307,282

(22) PCT Filed: Apr. 30, 2015

(86) PCT No.: PCT/KR2015/004412
§ 371 (c)(1),
(2) Date: Oct. 27, 2016

(87) PCT Pub. No.: WO2015/178599
PCT Pub. Date: Nov. 26, 2015

(65) Prior Publication Data
US 2017/0048029 A1 Feb. 16, 2017

Related U.S. Application Data

(60) Provisional application No. 62/002,168, filed on May 22, 2014.

(51) Int. Cl.
*H04B 7/02* (2017.01)
*H04L 5/00* (2006.01)
*H04B 7/04* (2017.01)
*H04B 7/06* (2006.01)
(Continued)

(52) U.S. Cl.
CPC ............ *H04L 5/0005* (2013.01); *H04B 7/04* (2013.01); *H04B 7/0413* (2013.01); *H04B 7/06* (2013.01); *H04L 5/00* (2013.01); *H04L 27/26* (2013.01)

(58) Field of Classification Search
CPC ..... H04L 1/0618; H04L 1/06; H04L 25/0204; H04L 27/2647; H04L 5/0007;
(Continued)

(56) References Cited

U.S. PATENT DOCUMENTS

2010/0260036 A1* 10/2010 Molnar ................. H04L 5/0053
370/203
2013/0023296 A1 1/2013 Kim et al.
(Continued)

FOREIGN PATENT DOCUMENTS

EP 2111004 A2 10/2009
EP 2566219 A1 3/2013
(Continued)

OTHER PUBLICATIONS

Priyanto et al., "Robust UE receiver with interference cancellation in LTE advanced heterogeneous network," 2013 IEEE 78th Vehicular Technology Conference (VTC Fall), IEEE, Sep. 2, 2013, 7 pages.

*Primary Examiner* — Zewdu Kassa
(74) *Attorney, Agent, or Firm* — Birch, Stewart, Kolasch & Birch, LLP

(57) ABSTRACT

Disclosed are a communication method and a MIMO transmitter for measuring the inter-channel relationship of a plurality of resource elements (REs) on the basis of channel information of the plurality of REs, and dividing the plurality of REs in consideration of the measured inter-channel relationship, thereby forming one or more RE groups, and transmitting information on the RE groups to a MIMO receiver.

18 Claims, 15 Drawing Sheets

(51) Int. Cl.
*H04L 27/26* (2006.01)
*H04B 7/0413* (2017.01)

(58) Field of Classification Search
CPC ............. H04L 27/2657; H04L 27/2662; H04L 5/0048; H04L 25/4902; H04L 1/0009; H04L 1/0041; H04L 25/49; H04L 1/0003; H04L 1/00; H04B 7/0417; H04B 7/0669; H04B 3/54
USPC ................ 375/267, 260, 259, 316, 219, 295
See application file for complete search history.

(56) References Cited

U.S. PATENT DOCUMENTS

| | | |
|---|---|---|
| 2013/0121276 A1 | 5/2013 | Kim et al. |
| 2013/0163544 A1 | 6/2013 | Lee et al. |
| 2013/0343318 A1* | 12/2013 | Gruet ...................... H04L 5/001 370/329 |
| 2014/0105120 A1 | 4/2014 | Jose et al. |
| 2015/0016379 A1 | 1/2015 | Nam et al. |

FOREIGN PATENT DOCUMENTS

| | | |
|---|---|---|
| KR | 10-2013-0075140 A | 7/2013 |
| KR | 10-2013-0079582 A | 7/2013 |
| KR | 10-2014-0019386 A | 2/2014 |
| WO | WO 2011/105809 A2 | 9/2011 |
| WO | WO 2013/125917 A1 | 8/2013 |
| WO | WO 2013/155908 A1 | 10/2013 |
| WO | WO 2013/177179 A1 | 11/2013 |
| WO | WO 2014/019284 A1 | 2/2014 |

* cited by examiner

METHOD BY WHICH MIMO TRANSMITTER FORMS RE GROUP

CROSS REFERENCE TO RELATED APPLICATIONS

This application is the National Phase of PCT International Application No. PCT/KR2015/004412, filed on Apr. 30, 2015, which claims priority under 35 U.S.C. 119(e) to U.S. Provisional Application No. 62/002,168, filed on May 22, 2014, all of which are hereby expressly incorporated by reference into the present application.

TECHNICAL FIELD

The present invention relates to technology related to a method of reducing implementation complexity while minimizing performance deterioration of a receiver in a massive multiple input multiple output (MIMO) environment.

BACKGROUND ART

A multiple input multiple output (MIMO) system refers to a wireless communication system using multiple transmit antennas and multiple receive antennas. In a MIMO system, fading effects occurring in a radio channel may be minimized via a diversity scheme or a plurality of streams may be simultaneously transmitted via spatial multiplexing, thereby improving throughput. If the number of transmit antennas is $N_t$ and the number of receive antennas is $N_r$, a maximum number of streams transmittable in a spatial multiplexing (SM) scheme is $\min(N_t, N_r)$. In particular, in a high signal-to-noise ratio (SNR) environment, it is known that the slope of communication capacity is $\min(N_t, N_r)$. Since communication capacity means a maximum amount of information theoretically transmittable on a given channel, communication capacity also increases when the numbers of transmit and receive antennas simultaneously increase.

A massive MIMO system having vast transmit and receive antennas is attracting considerable attention as 5G technology. In many papers and experiments, the massive MIMO system includes one base station (including a distributed antenna system) having multiple antennas and a plurality of user equipments (UEs) each having one antenna. In this case, since the UE has one antenna but several UEs simultaneously receive services from one base station, channels between the base station and the UEs may be understood as MIMO. If the total number of UEs is K, the slope of communication capacity is expressed by $\min(N_t, K)$ in a high SNR environment.

Theoretically, when a base station having an infinite number of transmit antennas simultaneously transmits data to several UEs, an optimal transmission algorithm of the base station is a maximal ratio transmission (MRT) algorithm. When one base station receives data transmitted from several UEs to the base station, an optimal reception algorithm of the base station is a maximal ratio combining (MRC) algorithm. Since the MRT and MRC algorithms do not take into account interference, if the number of antennas is finite, performance deterioration occurs but, if the number of antennas is infinite, interference disappears. Therefore, the MRT and MRC algorithms may become optimal solutions.

Since a base station can generate a sharp beam sharp via antenna beamforming, the base station may concentrate energy on a specific UE. In this case, the same information may be transmitted with low power and interference with neighboring UEs may be minimized, thereby minimizing system performance deterioration.

DISCLOSURE

Technical Problem

An object of the present invention devised to solve the problem is to minimize performance deterioration while reducing a burden of a multiple input multiple output (MIMO) receiver by enabling a MIMO transmitter to perform a process of forming RE groups in a massive MIMO environment.

Another object of the present invention is to enable a MIMO receiver to efficiently process a signal according to a communication environment by enabling a MIMO transmitter to adaptively form RE groups.

The technical problems solved by the present invention are not limited to the above technical problems and other technical problems which are not described herein will become apparent to those skilled in the art from the following description.

Technical Solution

The object of the present invention can be achieved by providing a method of, at a multiple input multiple output (MIMO) transmitter including a plurality of antennas, performing communication with a MIMO receiver including measuring correlation between channels of a plurality of resource elements (REs) based on channel information of the plurality of REs, forming one or more RE groups by grouping the plurality of REs in consideration of the measured correlation between the channels, and transmitting information on the RE groups to the MIMO receiver.

The plurality of REs may be arranged on a frequency axis and a time axis and configurations of the one or more RE groups may be determined based on the number and shape of the plurality of REs.

The forming the one or more RE groups may include forming the one or more RE groups by comparing correlation between the channels of the plurality of REs computed along a frequency axis with a first threshold and comparing correlation between the channels of the plurality of REs computed on a time axis with a second threshold.

The forming the RE groups may include selecting any one of predetermined configurations of the plurality of RE groups, and the transmitting may include transmitting an index value indicating the selected configuration of the RE group.

The transmitting may include transmitting an index value indicating a relation between the formed RE groups and previously formed RE groups.

The relation may be information indicating that the previously formed RE groups are maintained, enlarged, reduced or reset.

The transmitting may include transmitting the information on the RE groups periodically, aperiodically or according to a request of the MIMO receiver, and, in a period in which the information on the RE groups is not received, the MIMO receiver may directly form the RE groups based on the channel information of the plurality of REs or continuously use configurations of previously formed RE groups.

The method may further include receiving, from the MIMO receiver, information indicating a result of, at the MIMO receiver, directly forming the RE groups and forming new RE groups based on the received information.

The method may further include transmitting a control frame indicating a time when the information on the RE groups is transmitted, and the transmitting the information on the RE groups may include transmitting the information on the RE groups at the time indicated in the control frame.

In another aspect of the present invention, provided herein is a multiple input multiple output (MIMO) transmitter including a plurality of antennas and configured to generate a signal to be transmitted through the plurality of antennas includes a transmitter, a receiver, and a processor connected to the transmitter and the receiver to generate the signal to be transmitted, wherein the processor measures correlation between channels of a plurality of resource elements (REs) based on channel information of the plurality of REs, forms one or more RE groups by grouping the plurality of REs in consideration of the measured correlation between the channels, and controls the transmitter to transmit information on the RE groups to the MIMO receiver.

Advantageous Effects

Embodiments of the present invention have the following effects.

First, since a MIMO transmitter with a relatively low burden on power consumption and implementation complexity forms RE groups, it is possible to remarkably reduce computational complexity and memory requirements of a MIMO receiver.

Second, since the RE groups are adaptively formed, it is possible to reduce performance deterioration of an overall system while reducing the burden of the MIMO receiver.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE

Figure 1:
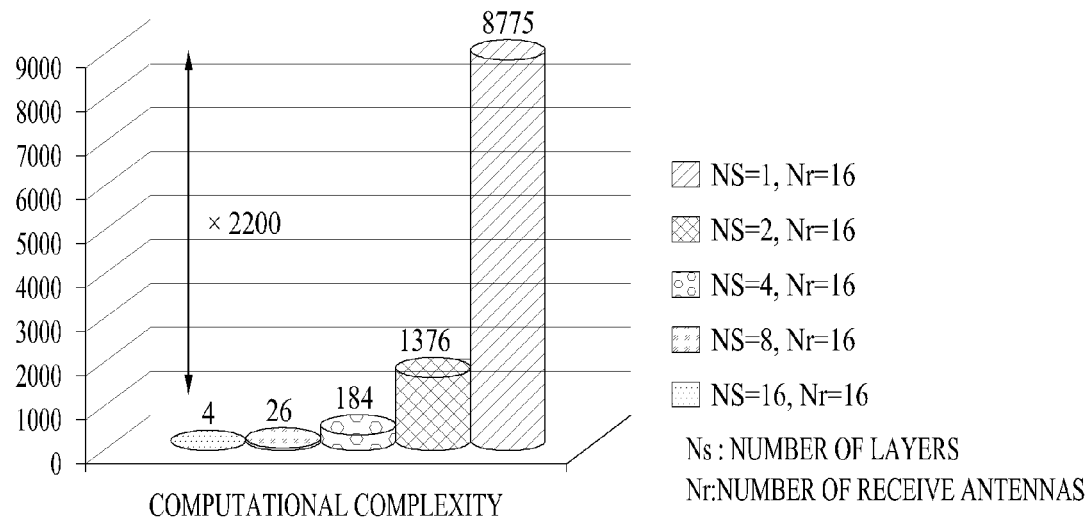
FIG. 1 is a diagram showing computational complexity according to the number of received streams in a multiple input multiple output (MIMO) environment, in relation to the present invention.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3$^{rd}$ Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Massive MIMO Receiver

To establish a massive MIMO system, a massive MIMO reception algorithm must be developed. As compared to an existing MIMO system, in a massive MIMO system, a receiver needs to be improved in terms of the following two aspects.

Figure 2:
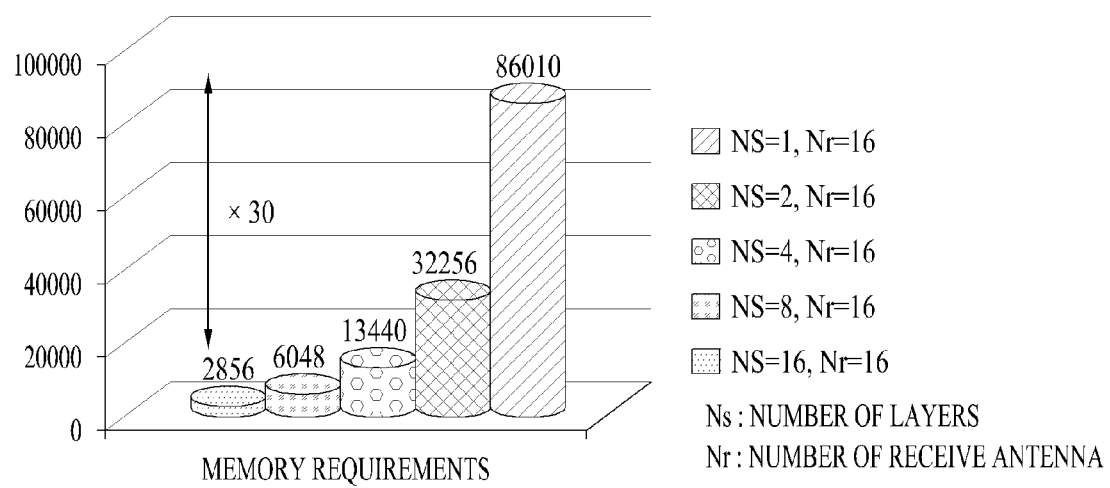
FIG. 2 is a diagram showing memory requirements according to the number of received streams in a MIMO environment, in relation to the present invention.

First, in a massive MIMO environment, the number of data streams simultaneously received by the receiver increases. Increase in the number of simultaneously processed data streams leads to increase in computational complexity and memory requirements. This leads to increase in system implementation cost and processing time, thereby imposing a burden on a reception system. Computational complexity and memory requirements according to the number of received streams of an existing MIMO reception algorithm exponentially increase as shown in FIGS. 1 and 2.

Second, in the massive MIMO environment, as the number of interference sources increases, a reception algorithm having improved interference cancellation performance is required. In the massive MIMO system, when a base station simultaneously transmits data to several tens or hundreds of users, each user receives several tens or more of multi-user interference signals except for a data signal transmitted thereto. Accordingly, there is a need for a massive MIMO reception algorithm for efficiently cancelling such interference signals. In addition, efficient cancellation of interference received from neighboring cells or users of neighboring cells is also required.

In order to solve such technical problems, the following technical issues are considered.

First, increase in computational complexity and memory requirements in a massive MIMO environment will be described. If the number of antennas of a transmitter is always greater than the number of antennas of a receiver, the number of streams transmitted by the transmitter is increased in proportion to the number of antennas of the receiver. At this time, the receiver uses a reception filter in order to detect each stream from a received signal. In an LTE system, the filter should be recomputed in every subframe.

Load caused due to such a computation process may be quantified to computational complexity and memory requirements. Complexity and memory requirements are proportional to the square or cube of the number of received streams. Accordingly, as the number $N_s$ of received streams increases, computational complexity and memory requirements rapidly increase, as shown in FIG. 1. Further, since hardware specification is determined by the worst case, hardware implementation cost significantly increases as the number of streams increases.

Hereinafter, a reception algorithm of a conventional MIMO receiver and/or computational complexity and memory requirements according to filter will be described.

The MRC algorithm requires smallest computational complexity $O(N_s^2)$ and memory. However, the MRC algorithm does not take into account interference between streams and thus provides low performance (that is, low reception SINR).

A minimum mean square error (MMSE) filter provides the best performance (that is, high reception SINR) among linear detection methods. However, complexity is expressed by $O(N_s^3)$ and $O(N_s^2)$ additional memories for inverse matrix operation are required. FIGS. 1 and 2 show complexity and memory requirements according to the number of received streams of the MMSE filter, respectively.

For reception using the MMSE filter, an inverse matrix operation for a channel matrix is necessary. The size of the inverse matrix is determined by the number of received streams and, for example, a time required for a high performance field programmable gate array (FPGA) to obtain a 15×15 inverse matrix is about 150 µs. Such time delay corresponds to about 30% of a coherence time of 500 µs assumed in an LTE channel model.

In addition, for inverse matrix operation for MMSE reception, a process of moving all channel information to a new memory is necessary, thereby leading to significant delay. In addition, a processor accesses a memory for inverse matrix operation, thereby leading to additional delay. Such delay significantly increases system processing time.

Lastly, an interference cancellation (IC) filter is a non-linear detection method and can obtain performance corresponding to maximum communication capacity in a D-BLAST receiver which is an example of IC. A V-BLAST receiver having low implementation complexity is configured in the form of a hybrid of MMSE and SIC. In particular, in a MIMO-OFDM environment, the V-BLAST receiver has performance close to maximum communication capacity as channel selectivity increases. However, since the V-BLAST receiver is also based on the MMSE filter, complexity and memory requirements higher than those of the MMSE filter are required.

In addition, the IC method cancels previously detected symbols and layers from a received signal to control interference. Accordingly, if the previously detected values have errors, an error propagation phenomenon in which detection performance deteriorates occurs. Various IC algorithms for solving such a problem have been proposed but have increased complexity as compared to the conventional method.

Figure 3:
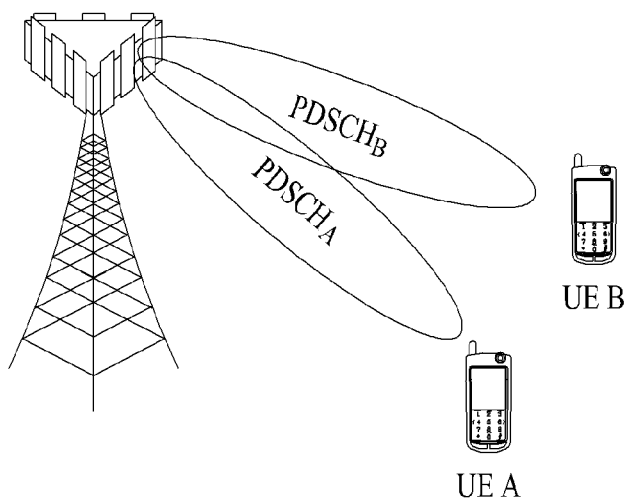
FIG. 3 is a diagram showing interference between UEs in the same cell in a MIMO environment in relation to the present invention.
Figure 4:
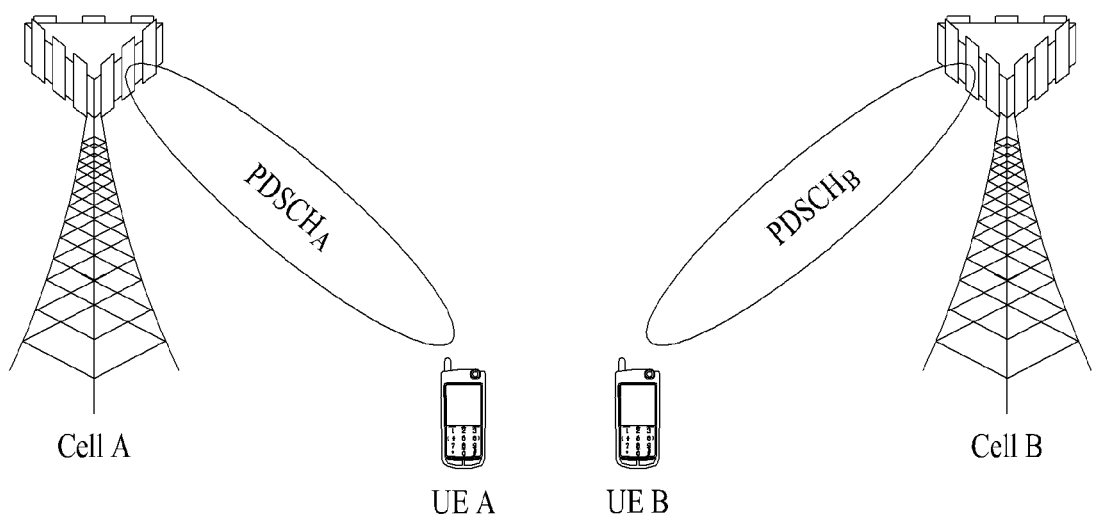
FIG. 4 is a diagram showing interference between neighboring cells in a MIMO environment in relation to the present invention.

FIG. 3 is a diagram showing interference between UEs in the same cell in a MIMO environment in relation to the present invention. FIG. 4 is a diagram showing interference between neighboring cells in a MIMO environment in relation to the present invention. In addition to increase in computational complexity and memory requirements, interference occurring in a massive MIMO environment will be described with reference to FIGS. 3 and 4.

If the number of antennas of a base station is large, one base station may simultaneously support a plurality of UEs. In this case, a signal transmitted from the base station to a UE A acts as interference with respect to a UE B and a signal transmitted to the UE B acts as interference with respect to the UE A. Since the interference is transmitted by the base station along with a desired signal, the interference undergoes the same path loss as the desired signal. Accordingly, power of the interference signal is similar to that of the desired signal and thus a reception SINR is rapidly reduced. In order to solve such a problem, the base station may perform multi user (MU)-MIMO precoding to minimize interference. However, even in this case, it is difficult to completely cancel multi-user interference due to channel information errors, aging phenomena and codebook size restriction.

In a multi-cell environment, interference among various cells is caused. Representatively, in the environment of FIG. 4, the UE A is influenced by interference from a base station B and the UE B is influenced by interference from a base station A. In particular, when a UE is close to a boundary between neighboring cells, the UE receives stronger interference from the neighboring base station. In addition, when a gap between cells is narrow as in a small cell (e.g., a micro cell, a pico cell, a femto cell, etc.), a probability that a UE receives strong interference from a neighboring cell is further increased.

In a dense multi-cell environment employing a massive MIMO method, interference cancellation capabilities of a MIMO receiver need to be improved. In particular, if strong interference is caused, an interference cancellation (IC) reception algorithm is required and an existing IC receiver requires more antennas than the number of interference sources. For example, the receiver requires 11 receive antennas in order to cancel 10 interference sources. In a small-sized UE in which a sufficient number of antennas may not be mounted, technologies for solving such a limitation need to be introduced. For example, improved interference suppression (IS) technology applies to multi-user or multi-cell interference or interference alignment technology is utilized in a transmitter to align interference in a specific signal space and an IC receiver is applied to cancel interference from many interference sources using a restricted number of receive antennas.

Figure 5:
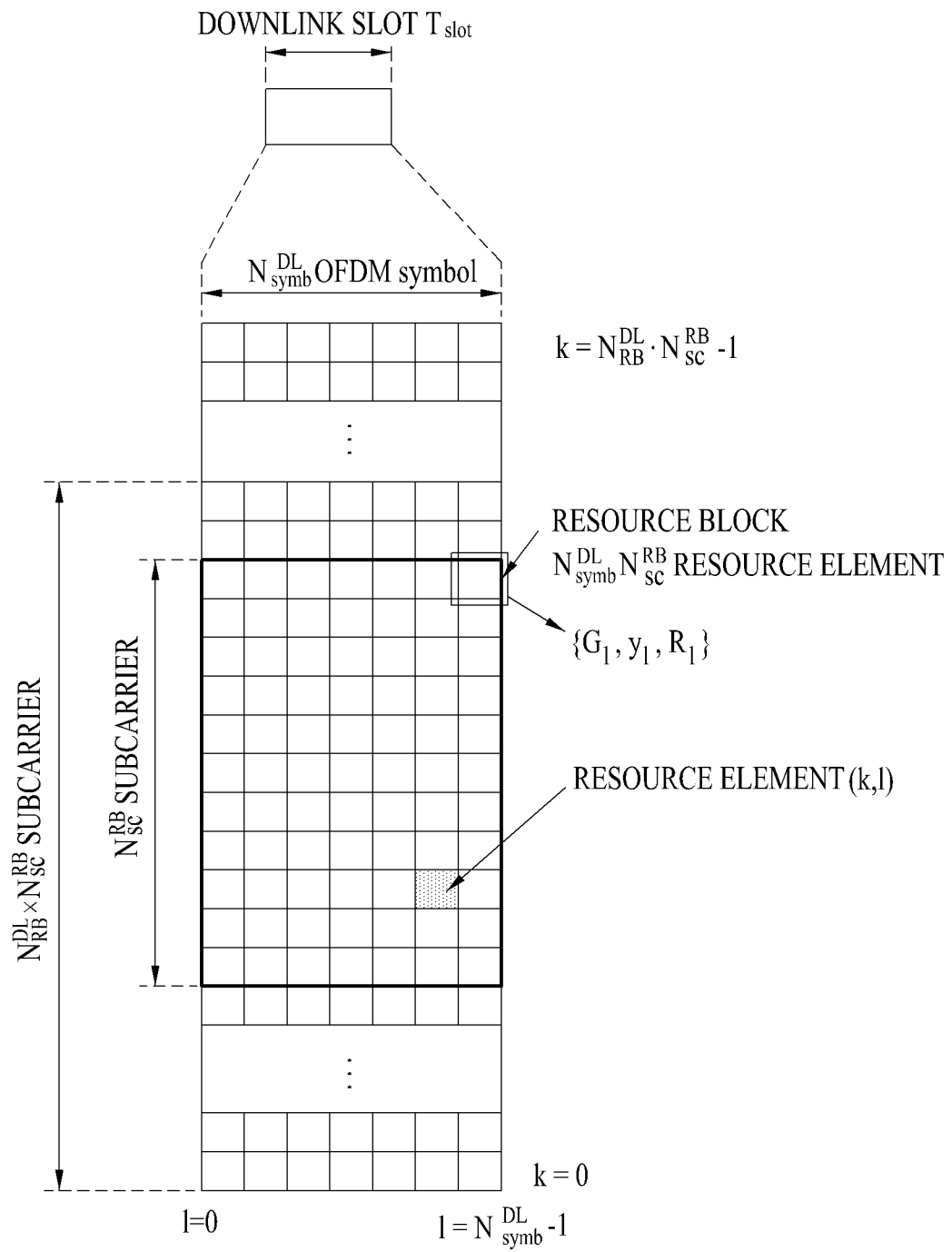
FIG. 5 is a diagram showing the structure of a resource block (RB) assigned to a UE in relation to the present invention.
Figure 6:
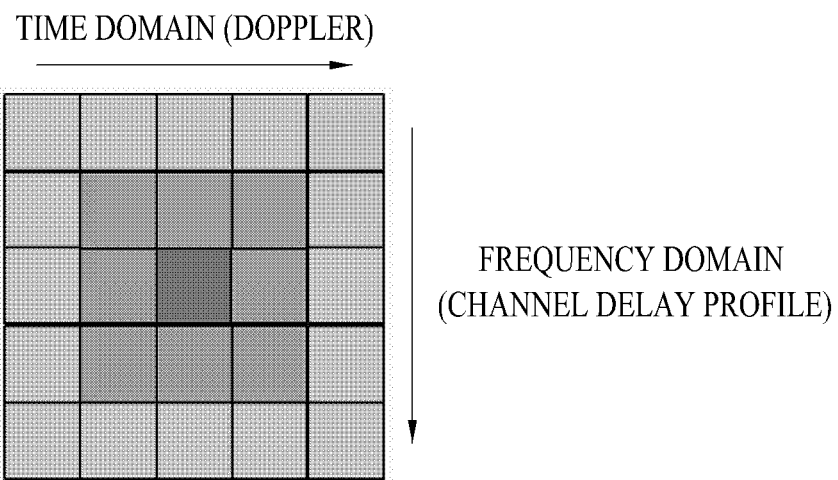
FIG. 6 is a diagram showing a resource element (RE) group formed by a plurality of REs in relation to the present invention.
Figure 7:
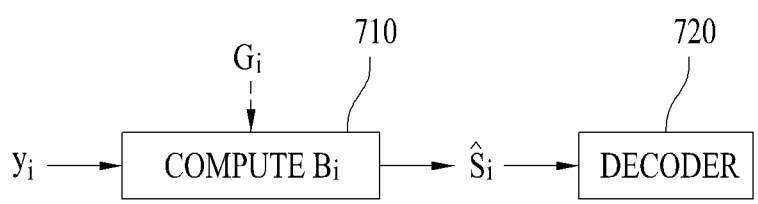
FIG. 7 is a diagram showing a conventional MIMO receiver operational process in relation to the present invention.

Subsequently, an operation algorithm of a conventional MIMO receiver will be described in relation to the above-described problems. FIG. 5 is a diagram showing the structure of a resource block (RB) assigned to a UE in relation to the present invention. FIG. 6 is a diagram showing a resource element (RE) group formed by a plurality of REs in relation to the present invention. FIG. 7 is a diagram showing a conventional MIMO receiver operational process in relation to the present invention.

FIG. 5 shows one RB assigned to a specific UE and vertical and horizontal axes respectively denote frequency and time axes. One RB is composed of $N_{SC}^{RB} N_{symb}^{DL}$ REs and, in each RE, a received signal is expressed by Equation 1 below.

$$y_l = G_l s_l + i_l + w_l, l = 0, \ldots, N_{SC}^{RB} N_{symb}^{DL} - 1 \quad \text{Equation 1}$$

In Equation 1, l denotes an index of an RE, $G_l$ denotes a channel estimated via a demodulation reference signal (DMRS) in a receiver, $s_l$ denotes a transmitted signal, and $I_l$ denotes interference. $w_l$ denotes white noise and a covariance matrix of $w_l$ is $\theta_w^2 I$.

As described above, the receiver may use a minimum mean square error (MMSE) filter in order to cancel influence of a channel from a received signal. A transmitted signal detected from the received signal using the MMSE filter is expressed by Equation 2 below.

$$\hat{s}_l = B_l y_l \text{ with } B_l = (G_l^H G_l + R_l)^{-1} G_l^H \quad \text{Equation 2}$$

In Equation 2, $B_l$ denotes an MMSE filter and $\hat{s}_l$ denotes a transmitted signal estimated via the MMSE filter. A covariance matrix RI is defined as $R_l=i_l i_l^H+\theta_w^2 I$. At this time, computational complexity of multiplication of complex numbers necessary to estimate the transmitted signal using the MMSE filter may be schematically expressed by Equation 3 below.

Equation 3

$$\left(\frac{1}{2}N_r N_s^2 + \frac{1}{2}N_s^3 + N_s^2 + N_r N_s\right) N_{RB}^{DL} N_{symb}^{DL}$$

Equation 3

In case of massive MIMO, the number $N_r$ of receive antennas is large and, in this case, streams corresponding in number $N_s$ to a maximum number of receive antennas may be received. In this case, communication capacity of the receiver may be improved by a maximum of $N_s$ times but complexity is rapidly increased in proportion to the cube $O(N_s^3)$ of the number of streams. Accordingly, if the number of received streams is large, a receiver capable of performing processing with low complexity while minimizing performance deterioration is necessary.

FIG. 6 shows a portion of an RB of FIG. 5 and shows an RE group composed of several REs. At this time, channels of the REs may have mutual correlation. In particular, if the Doppler effect is small (the receiver is slowly moved or is fixed), correlation between the REs located on the same horizontal axis is large. If power delay spread of a channel is low, correlation between the REs located on the same vertical axis is large. If the Doppler effect is small and power delay spread of the channel is low, correlation between all REs shown in FIG. 6 is large. In FIG. 6, correlation between a center RE and a peripheral RE is shown by the depth of shade. That is, as the depth of shade of each RE increases, correlation with the center RE increases and, as the depth of shade of each RE decreases, correlation with the center RE decreases.

As shown in FIG. 7, a conventional MIMO receiver has applied to the same operation to REs without considering correlation between the REs to detect a transmitted signal. That is, the conventional MIMO receiver has performed a process of computing a filter $B_l$ from channel information $G_l$ per RE with respect to a received signal (710) and detecting and decoding a received signal with respect to each RE (720). However, when taking into account increase in computational complexity and memory requirements due to increase in number of streams in a massive MIMO environment, a conventional reception algorithm needs to be improved.

Hereinafter, a MIMO receiver operating according to an algorithm having lower complexity while providing the same performance as an existing algorithm using correlation between REs is proposed.

2. Method of Operating MIMO Receiver Using Preprocessing Filter

Figure 8:
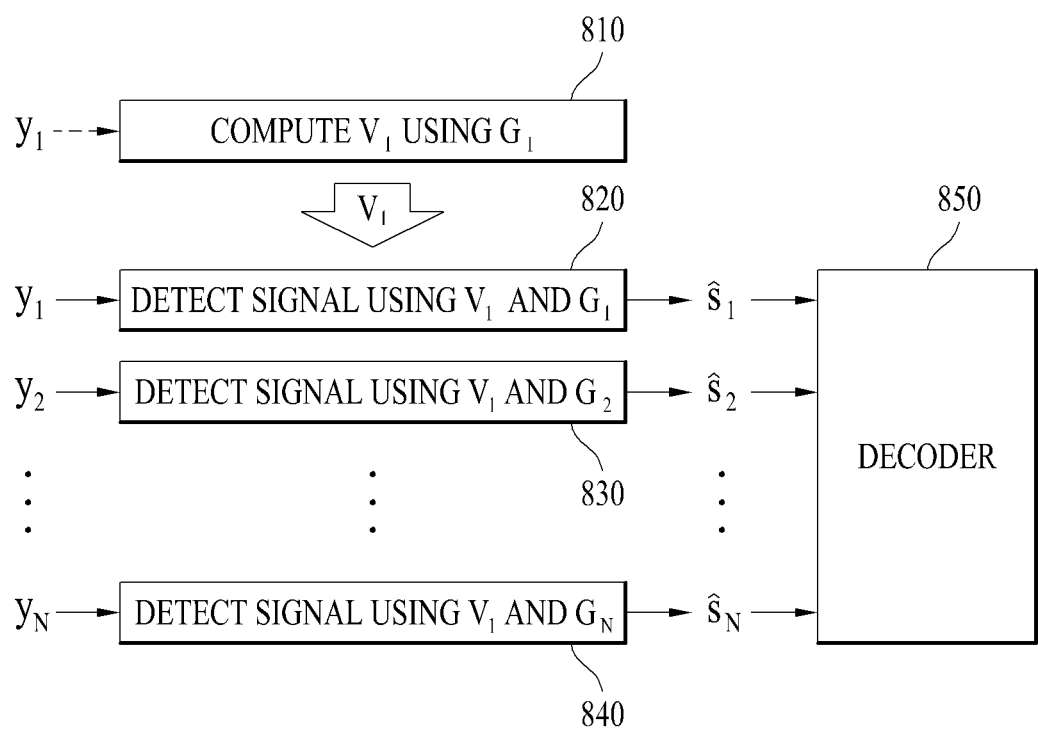
FIG. 8 is a diagram showing a MIMO receiver operational process related to the present invention.

FIG. 8 is a diagram showing a process of operating a MIMO receiver using a preprocessing filter according to an embodiment of the present invention.

A MIMO receiver using the preprocessing filter configures a plurality of REs having relatively high correlation between channels as one RE group (having a size of N), as described with reference to FIG. 6. Hereinafter, a signal $\hat{s}_l$ detected using a received signal detector (e.g., an MMSE filter) from a received signal of an l-th RE of an RE group is defined as a "detection signal". In the case of the MIMO receiver described with reference to FIG. 7, if the number of layers is large in a process of detecting the detection signal from the received signal, the complexity problems of FIG. 1 occur. In order to reduce such complexity, the proposed MIMO receiver uses a numerical analysis algorithm (e.g., a conjugate gradient (CG) algorithm), instead of directly computing the MMSE filter to detect the detection signals of the REs of the RE group.

Hereinafter, $v_1$ means a "preprocessing filter (or an acceleration filter)" generated based on the MIMO channel of a first RE of the RE group. The above-described numerical analysis algorithm finds a value through an iterative computation process and a value becomes close to an accurate value as the iterative computation process proceeds. If the preprocessing filter $v_1$ is used in the iterative computation process, the MIMO receiver can find a desired value with a small iteration number (that is, at a high speed).

However, generating the preprocessing filter capable of sufficiently increasing the speed in order to find the desired value as described above requires high complexity. Accordingly, in order to decrease computational complexity of the case of obtaining the respective preprocessing filters with respect to all of the REs of the RE group, a preprocessing filter may be generated with respect to a specific RE (e.g., the first RE) and may be shared among the other REs of the RE group. That is, in the process of detecting the detection signals with respect to the REs of the RE group, the numerical analysis algorithm uses the same preprocessing filter. The specific RE (or the first RE) may be defined as a "reference RE", which is used to compute the preprocessing filter and is not related to the order or index of the RE in the RE group.

Accordingly, if channel correlation between REs in the group is high, the proposed MIMO receiver shares the preprocessing filter (810) generated from one RE among all of the REs of the RE group and the numerical analysis algorithm generates the detection signals using the preprocessing filter (820, 830 and 840). Accordingly, the same performance can be obtained with less complexity than the conventional MIMO receiver. As channel correlation between the first RE and another RE in the RE group increases, such iteration speed shortening effects increase.

Figure 9:
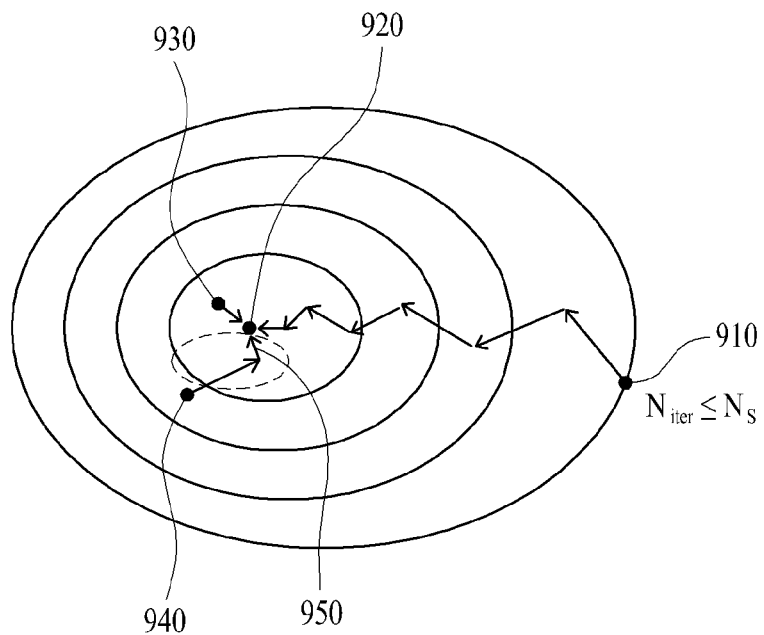
FIG. 9 is a diagram showing the concept of a process of detecting a detection signal at a MIMO receiver related to the present invention.
Figure 10:
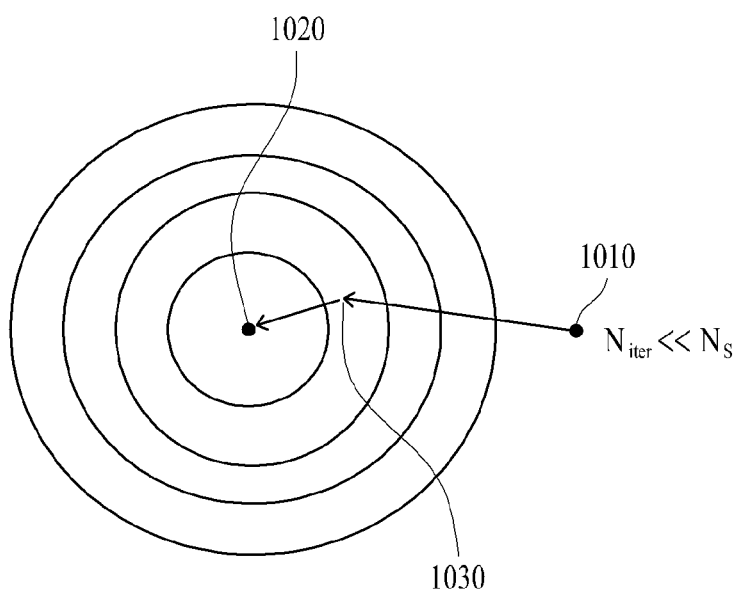
FIG. 10 is a diagram showing the concept of a process of detecting a detection signal at a MIMO receiver related to the present invention.

FIGS. 9 and 10 are diagrams showing the concept of a process of detecting a detection signal at a MIMO receiver using a preprocessing filter. FIG. 9 shows a process of detecting a detection signal of a MIMO receiver operating according to a method of sharing a received signal detector (or a reception filter) and FIG. 10 is a process of detecting a detection signal of a MIMO receiver operating according to a method of sharing the above-described preprocessing filter. In FIGS. 9 and 10, an arrow means an iterative computation process of a numerical analysis algorithm.

First, in FIG. 9, the center 920 of circles means a desired value, that is, an accurate value, of the MIMO receiver. If a detection value is slightly different from the accurate value (910), the numerical analysis algorithm may reach the accurate value (920) through several iterative processes. In contrast, if a detection signal is relatively close to the accurate value (930 and 940), the accurate value (920) can be found with a smaller iteration number (950). Accordingly, the MIMO receiver operating according to the reception filter sharing method operates to share the reception filter such that the initial value of the detection signal becomes close to the accurate value (that is, an error decreases).

In contrast, in FIG. 10, the MIMO receiver operating according to the preprocessing filter sharing method operates to decrease the iteration number instead of enabling the initial value of the detection signal to become close to the desired value (that is, the center 1020 of the circles). That is, the MIMO receiver according to the proposed method can find the desired value with a relatively smaller iteration number (1030) as compared to FIG. 9 even when an initial value significantly different from the desired value 1020 of the numerical analysis algorithm is computed (1010). In other words, in FIG. 10, the MIMO receiver operates to rapidly increase the convergence speed according to the iterative computation of the numerical analysis algorithm so as to decrease complexity.

Hereinafter, an embodiment in which such a MIMO receiver generates the preprocessing filter $v_1$ will be described in detail.

According to a first embodiment, the preprocessing filter may be generated by various algorithms such as a Jacobi method, a Gauss-Siedel method, an SQR preconditioning method and an incomplete Cholesky factorization method.

First, an arbitrary matrix $A_1$ may be defined based on the MIMO channel of the reference RE (first RE) as shown in Equation 4 below.

$$A_1 = G_1^\dagger G_1 + R \qquad \text{Equation 4}$$

Since the matrix $A_1$ is a positive definite matrix and is symmetric, Equation 4 may be factorized as shown in Equation 5 below.

$$A_1 = L_1 + D_1 + L_1^H \qquad \text{Equation 5}$$

In Equation 5, $L_1$ denotes a lower triangular matrix and $D_1$ denotes a diagonal matrix. In Equation 5, the preprocessing filter $V_1$ according to three methods among the above-described various methods may be defined.

$$V_1 = D_1^{-1} \qquad \text{Jacob method:}$$

$$V_1 = (L_1 + D_1)^{-1} \qquad \text{Gauss-Siedel method:}$$

$$V_1 = w(L_1 + wD_1)^{-1} \qquad \text{SQR preconditioning method:}$$

(w is an arbitrary constant)

Among the above-described methods, the Gauss-Siedel method and the SQR preconditioning method may clearly express the preprocessing filter $V_1$ by computing an actual inverse matrix. However, in order to reduce computational complexity for obtaining the inverse matrix, $V_1$ may be computed through a back substitution process according to Equation 6 below, without accurately computing $V_1$.

$$x = V^{-1}y \to Vx = y \qquad \text{Equation 6}$$

In Equation 6, if V is a lower triangular matrix, X which is the value of Equation 6 may be sequentially computed from the right equation of Equation 6. In addition to the above-described three methods, if the incomplete Cholesky factorization method is applied, $A_1$ of Equation 5 may be factorized to an incomplete Cholesky factor $\hat{L}_1$, as shown in Equation 7 below. $\hat{L}_1$ is a lower triangular matrix.

$$A \approx \hat{L}_1 \hat{L}_1^H \qquad \text{Equation 7}$$

Although the incomplete Cholesky factorization method may factorize $A_1$ with complexity less than that of the complete Cholesky factorization method, an approximated lower triangular matrix is defined. In the incomplete Cholesky factorization method, the preprocessing filter $V_1$ is defined as Equation 8 below.

$$V_1 = (\hat{L}_1^H)^{-1} L_1^{-1} \qquad \text{Equation 8}$$

The preprocessing filter $V_1$ according to Equation 8 may be accurately expressed by directly computing an inverse matrix or may be computed and expressed by a back substitution process.

The preprocessing filter $V_1$ according to the embodiment of the present invention may be computed and defined according to various methods in addition to the above-described methods. For example, various methods and algorithms disclosed in "Iterative Methods for Sparse Linear Systems" may be used for the process of computing the preprocessing filter $V_1$.

As a second embodiment of generating the preprocessing filter, the preprocessing filter $V_1$ may be generated using the properties of the MIMO channel of the RE. In order to compute $A_1$ according to the above-described first embodiment, a matrix X matrix operation process $G_1^\dagger G_1$ is required. In order to improve computational complexity of such an operation process, in the second embodiment, the MIMO channel of the RE is used to compute $A_1$ with low complexity.

More specifically, in the reference RE, $G_1^\dagger G_1$ may be approximated to a diagonal matrix $Z_1$ of Equation 9 below.

$$Z_1 \triangleq \begin{bmatrix} g_1^H g_1 & 0 & \cdots & 0 \\ 0 & g_2^H g_2 & \ddots & \vdots \\ \vdots & \ddots & \ddots & 0 \\ 0 & \cdots & 0 & g_{N_s}^H g_{N_s} \end{bmatrix} \approx G_1^\dagger G_1 \qquad \text{Equation 9}$$

$$G_1 = [\, g_1 \ g_2 \ \cdots \ g_{N_s} \,]$$

Approximation of Equation 9 becomes accurate when the number $N_s$ of stream increases and correlation between channel elements decreases. In such approximation, off-diagonal terms may be approximated to 0 according to the properties of the channel in the massive MIMO environment. According to the above-described approximation process, the matrix $A_1$ may be defined by the diagonal matrix of Equation 10.

$$A_1 = Z_1 + R \qquad \text{Equation 10}$$

Subsequently, since $A_1$ of Equation 10 may be expressed only by diagonal elements, the Jacobi method described in the first embodiment is applicable to $A_1$ of Equation 10 to compute the preprocessing filter $V_1$. In the second embodiment, if an error is large in the approximation process, the decrement of the iteration number of the numerical analysis algorithm may not be large. That is, the speed of converging on the desired value may not increase.

Figure 11:
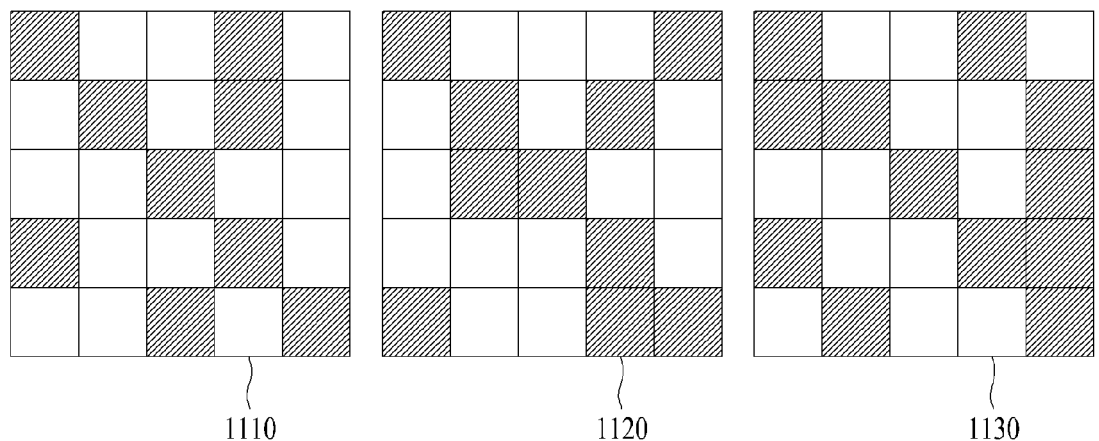
FIG. 11 is a diagram showing an example of generating a preprocessing filter at a MIMO receiver related to the present invention.

Subsequently, a third embodiment of generating a preprocessing filter will be described with reference to FIG. 11. FIG. 11 is a diagram showing an example of generating a preprocessing filter at a MIMO receiver in relation to the present invention.

In the third embodiment, $Z_1$ having a small difference from $G_1^\dagger G_1$ of the first embodiment is found and the method proposed in the second embodiment is used. For example, if the MIMO channel matrix $G_1$ is approximated to a matrix $\tilde{G}_1$ having shapes 1110, 1120 and 1130 shown in FIG. 11, it is possible to significantly reduce computational complexity of $A_1$. In FIG. 11, a black element indicates a non-zero value and a white element indicates a zero value. That is, the value of each element of the channel matrix is compared with a predetermined threshold to approximate the value of the element less than the threshold to 0. At this time, the rank of the approximated $\tilde{G}_1$ should be equal to $G_1$.

The three embodiments of computing the preprocessing filter $V_1$ have been described above. Hereinafter, a numerical analysis algorithm for detecting a detection signal using a preprocessing filter will be described.

The numerical analysis algorithm replaces inverse matrix operation of MMSE, zero forcing (ZF), interference rejection combining (IRC), and BLAST algorithms for detecting and generating detection signals with respect to an RE group. The proposed numerical analysis algorithm is applicable to all MIMO receivers described in TR 36.866 for NAIC v1.1.0. Such a numerical analysis algorithm replaces only the above-described inverse matrix operation and thus has detection performance equal or similar to that of the conventional MIMO receiver while improving complexity.

As the numerical analysis algorithm, a conjugate gradient (CG) algorithm, a Newton method algorithm or a steepest descent method algorithm may be used. In the numerical analysis algorithm, a value is calculated with a small iteration number (that is, at a high speed) using the above-described preprocessing filter $V_1$ and the effect of reducing the iteration number increases as correlation between a reference RE for generating a preprocessing filter and another RE increases.

For example, using FIG. 8 and the CG algorithm, the numerical analysis algorithm will be described in detail. The CG algorithm is a converging algorithm for iteratively performing an operation until predetermined accuracy is derived. As the algorithm is iterated, a result having a smaller error is derived.

First, a MIMO receiver groups a plurality of REs having correlation equal to or greater than a predetermined value to form one RE group shown in FIG. 6. Any one RE included in the RE group becomes a reference RE (first RE) and the MIMO receiver generates a preprocessing filter using the MIMO channel of the reference RE. Although the reference RE of the RE group may be closest to the center on the time/frequency axis, the present invention is not limited thereto.

The MIMO receiver generates detection signals $\hat{s}_l$ with respect to the other REs of the RE group using the numerical analysis algorithm (CG algorithm) based on the preprocessing filter $V_1$ of the reference RE. The CG algorithm may be implemented in the form of Equation 11 below.

$$\hat{s}^{(0)} = I_{N_s} \times 1$$
$$t = G_l^H G_l \hat{s}^{(0)} + R\hat{s}^{(0)}$$
$$b = G_l^H y_l$$
$$g^{(0)} = b - t$$
$$d^{(0)} = V_1 g^{(0)}$$
$$\text{while } \|g^{(i)}\| > \delta \|g^{(0)}\| \, do$$
$$t = (g^{(i)})^\dagger V_1 g^{(i)}$$
$$t = G_l^H G_l d^{(i)} + R d^{(i)}$$
$$\alpha^{(i)} = \frac{t}{(d^{(i)})^\dagger t}$$
$$\hat{s}^{(i+1)} = \hat{s}^{(i)} + \alpha^{(i)} d^{(i)}$$
$$g^{(i+1)} = g^{(i)} - \alpha^{(i)} t$$
$$\beta^{(i+1)} = \frac{(g^{(i+1)})^\dagger V_1 g^{(i+1)}}{t}$$

Equation 11

$$d^{(i+1)} = V_1 g^{(i+1)} + \beta^{(i+1)} d^{(i)}$$
$$\text{end while}$$
$$\hat{s}_l = \hat{s}^{(end)}$$

In Equation 11, $\hat{s}^{(i)}$ is an estimated transmission signal in i-th iteration of the numerical analysis algorithm. The transmission signal of the $0^{th}$ iteration, that is, an initial value $\hat{s}^{(0)}$, is set to a vector composed of all entries of 1. $\hat{d}^{(i)}$, $\hat{d}^{(i)}$ and $\hat{b}^{(i)}$ denote temporary vectors for obtaining a value and $f_1$, $f_2$ denote functions for determining a relation between the temporary vectors. The vector $\hat{s}^{(i)}$ is a gradient vector and indicates a fastest direction in which the iterative algorithm converges on an accurate value. At this time, if a difference between the updated vector $g^{(i)}$ and the initially generated vector $g^{(0)}$ is less than a predetermined threshold, algorithm iteration is stopped. That is, through the size of the vector $\hat{g}^{(i)}$, a difference between a result obtained by directly calculating a MMSE filter and a secondary signal may be indirectly confirmed. If the $g^{(i)}$ value is 0, a difference between the secondary signal and the result obtained using the MMSE is 0.

In Equation 11, $\delta$ determines an end time of the algorithm and may mean target accuracy of the algorithm. $\delta$ may be automatically determined by a system or may be determined according to user input. As $\delta$ decreases, an algorithm iteration number increases and the accuracy of a result increases and, as $\delta$ increases, an algorithm iteration number decreases and the accuracy of a result decreases. That is, an allowable error between a value obtained using the CG algorithm and a value obtained using the MMSE filter is determined according to the level of $\delta$. The MIMO receiver may control $\delta$ to provide trade-off between complexity and performance. Meanwhile, in the CG algorithm, if an iteration number becomes equal to the size of a square matrix, a value obtained through the CG algorithm and a value obtained using the MMSE filter become equal to each other.

According to one embodiment, the MIMO receiver may restrict the iteration number of the numerical analysis algorithm to restrict a maximum time required to detect the detection signal. If a time required for the MIMO receiver to detect the signal of a specific RE is relatively greater than a time required to detect the signal of another RE, the total processing time of the system is influenced. In order to prevent such a problem, the time required to detect the detection signal may be restricted to a specific range.

The detection signal may be restricted by restricting the iteration number of the numerical analysis algorithm. That is, since a time required for iteration of the numerical analysis algorithm is constant, the MIMO receiver may control an iteration time by restricting the iteration number. Restricting the iteration number may increase an error between the value obtained through the CG algorithm and the value obtained using the MMSE filter. There is a trade-off between performance deterioration and a processing time.

Figure 12:
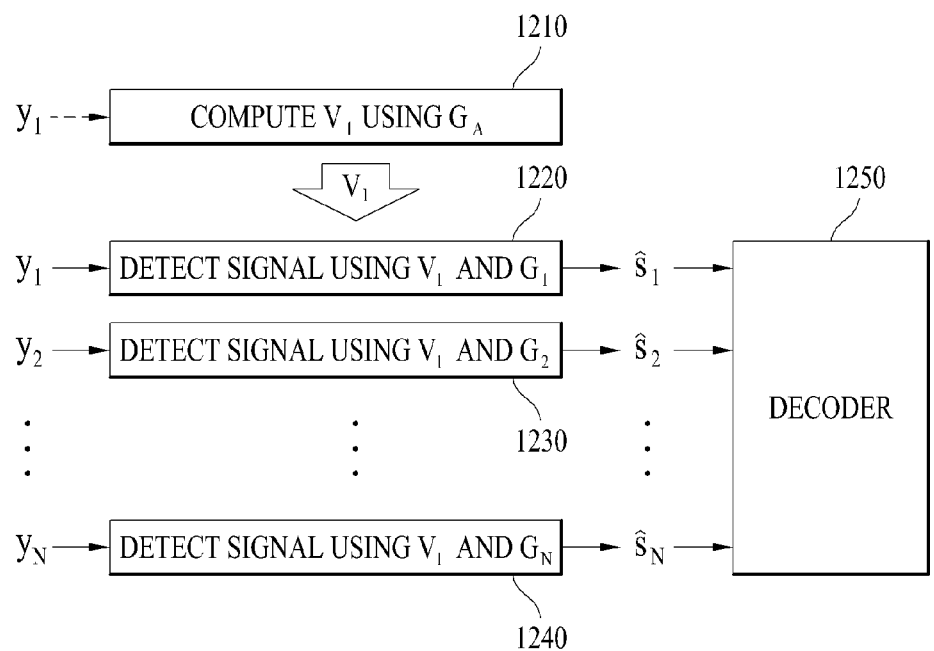
FIG. 12 is a diagram showing another MIMO receiver operational process related to the present invention.

FIG. 12 is a diagram showing a MIMO receiver operational process of another embodiment using a preprocessing filter. In FIG. 12, another embodiment of generating a preprocessing filter $V_1$ will be described.

In FIG. 12, the preprocessing filter $V_1$ is computed using the channels of all of the REs of the RE group. For example, $V_1$ may be generated based on $G_A$ computed in Equation 12 below.

$$G_A = \frac{1}{N}\sum_{l=1}^{N} w_l G_l \qquad \text{Equation 12}$$

In Equation 12, N denotes the number of REs in the RE group and $w_l$ denotes a weight of each channel matrix. In the case of $w_l=1$, $G_A$ is defined as an average of all channel matrices. The MIMO receiver computes the preprocessing filter $V_1$ to be shared in the RE group based on the channel matrix $G_A$ computed in Equation 12 (1210). Subsequently, the MIMO receiver detects the detection signal of each RE using the preprocessing filter $V_1$ (1220, 1230 and 1240).

The embodiment in which the MIMO receiver generates the preprocessing filter $V_1$ and the embodiment in which the detection signal is generated using $V_1$ have been described with reference to FIGS. 8 to 12. Hereinafter, an embodiment in which a reception filter is shared in an RE group will be described with reference to FIGS. 13 to 15, in addition to an embodiment in which a preprocessing filter is shared in an RE group.

Figure 13:
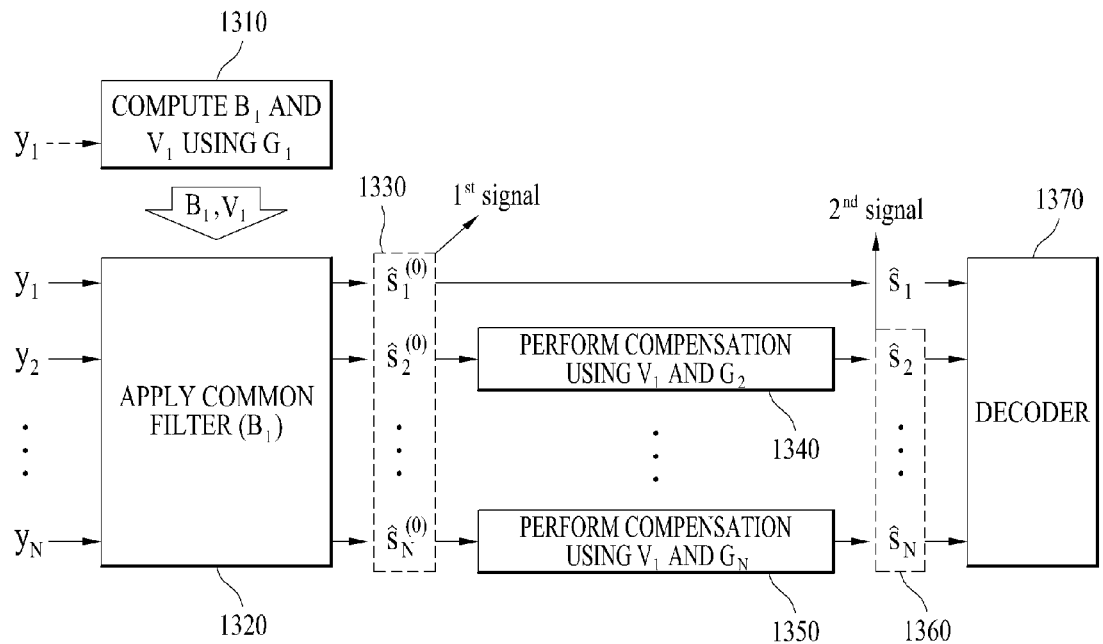
FIG. 13 is a diagram showing another MIMO receiver operational process related to the present invention.

FIG. 13 is a diagram showing a MIMO receiver operational process of another embodiment using a preprocessing filter. In FIG. 13, unlike FIG. 8, the MIMO receiver generates a preprocessing filter $V_1$ and a reception filter $B_1$ based on a channel $G_1$ of a reference RE of an RE group (1310). $V_1$ and $B_1$ are shared among all of the REs of the RE group and the MIMO receiver detects a primary signal from a received signal using the reception filter $B_1$ (1320 and 1330). Subsequently, the MIMO receiver detects a secondary signal through a process of compensating for the primary signal using the preprocessing filter $V_1$ and the numerical analysis algorithm based on a unique channel of each RE (1340, 1350 and 1360).

The above-described process will be described in detail with reference to Equation 13 below.

$$\begin{aligned}
b &= G_l^H y_l \\
\hat{s}^{(0)} &= B_1 b \\
t &= G_l^H G_l \hat{s}^{(0)} + R\hat{s}^{(0)} \\
g^{(0)} &= b - t \\
d^{(0)} &= V_1 g^{(0)} \\
&\text{while } \|g^{(i)}\| > \delta\|g^{(0)}\| \text{ do} \\
t &= (g^{(i)})^\dagger V_1 g^{(i)} \\
t &= G_l^H G_l d^{(i)} + R d^{(i)} \\
\alpha^{(i)} &= \frac{t}{(d^{(i)})^\dagger t} \\
\hat{s}^{(i+1)} &= \hat{s}^{(i)} + \alpha^{(i)} d^{(i)} \\
g^{(i+1)} &= g^{(i)} - \alpha^{(i)} t \\
\beta^{(i+1)} &= \frac{(g^{(i+1)})^\dagger V_1 g^{(i+1)}}{t} \\
d^{(i-1)} &= V_1 g^{(i-1)} + \beta^{(i-1)} d^{(i)} \\
&\text{end while} \\
\hat{s}_l &= \hat{s}^{(end)}
\end{aligned} \qquad \text{Equation 13}$$

In Equation 13, $\hat{s}_l^{(0)}$ denotes a primary signal detected from the received signal of an l-th RE using the reception filter $B_1$ generated based on the channel of the reference RE.

The numerical analysis algorithm of Equation 13 compensates for the primary signal using the preprocessing filter $V_1$ generated from the reference RE to generate the secondary signal $\hat{s}_l$. If correlation between the reference RE and another RE of the RE group is high, the primary signal detected using the common reception filter $B_1$ is similar to a value directly obtained using the MMSE filter and the process of, at the numerical analysis algorithm, compensating for the primary signal using the preprocessing filter $V_1$ to detect the secondary signal is more rapidly performed. In contrast, if correlation is small, an error between the primary signal and the value directly obtained using the MMSE filter is large and the process of detecting the secondary signal is little different from that of the case where the preprocessing filter is not used.

Hereinafter, an embodiment of obtaining the preprocessing filter $V_1$ in the embodiment of FIG. 13 will be described. In FIG. 13, unlike FIG. 8, since the common reception filter $B_1$ shared in the RE group is computed, the process of computing the preprocessing filter $V_1$ may be different from the process of FIG. 8.

First, an arbitrary matrix $A_1$ is defined based on the channel of the reference RE as shown in Equation 14.

$$A_1 = G_1^H G_1 + R \qquad \text{Equation 14}$$

In Equation 14, $A_1$ has an inverse matrix relation $B_1 = A_1^{-1}$ with the common reception filter $B_1$. The MIMO receiver may define the preprocessing filter $V_1$ based on the matrix $A_1$ according to the following three embodiments.

First, the preprocessing filter $V_1$ may be the inverse matrix of the common reception filter $B_1$. That is, the common reception filter $B_1$ may be the preprocessing filter $V_1$. This embodiment is expressed as shown in Equation 15 and, if the common reception filter $B_1$ is computed, the MIMO receiver uses the common reception filter $B_1$ as the preprocessing filter. Since the common reception filter and the preprocessing filter are the same, the MIMO receiver does not need to further compute $V_1$ and does not require a memory used to compute and store $V_1$.

$$V_1 = A_1^{-1} = B_1 \qquad \text{Equation 15}$$

Second, the MIMO receiver may factorize $A_1$ according to the complete Cholesky factorization method to compute the preprocessing filter $V_1$. Such a process is performed through three steps according to the following order.

i) $A_1 = L_1 L_1^H$ ($L_1$ is a lower triangular matrix)

ii) $B_1 (L_1^H)^{-1} L_1^{-1}$ iii) $V_1 = (\hat{L}_1^H)^{-1} \hat{L}_1^{-1}, \hat{L}_1 \approx L_1$ If a back substitution process is used, the process of obtaining the inverse matrix of the lower triangular matrix $L_1$ in step ii) may be omitted. That is, in the second method, when applying $B_1$ and $V_1$, complexity can be reduced using the back substitution process. In this case, the main complexity of the process of generating the preprocessing filter $V_1$ and the common reception filter $V_1$ occurs in step i).

Step iii) is a step of generating a sparse preprocessing filter (a matrix, the most elements of which are 0) through approximation of $\hat{L}_1 \approx L_1$. In such a process, if the preprocessing filter is a sparse filter, computational complexity is significantly reduced per iteration of the numerical analysis algorithm.

In a third method, the preprocessing filter $V_1$ may be computed according to the incomplete Cholesky factorization method. Such a process is performed through three steps according to the following order.

$A_1 \approx \hat{L}_1 \hat{L}_1^H$ ($\hat{L}_1$ is a lower triangular matrix)  i)

$B_1 (\hat{L}_1^H)^{-1} \hat{L}_1^{-1}$  ii)

$V_1 = (\hat{L}_1^H)^{-1} \hat{L}_1^{-1}$  iii)

In the second embodiment, the main complexity of the process of generating the preprocessing filter $V_1$ and the common reception filter $B_1$ occurs in step i). Accordingly, in the third embodiment, instead of using the complete Cholesky factorization in step i), $\hat{L}_1$ is computed using incomplete Cholesky factorization.

If the preprocessing filter $V_1$ and the common reception filter $B_1$ are computed based on $\hat{L}_1$, unlike the second embodiment, even the secondary signal of the reference RE should be computed through the compensation process. This is because $B_1$ is an approximated inverse matrix and thus an error may occur in the reference RE. As a result, the third embodiment requires lowest complexity upon generating the common reception filter and the preprocessing filter but requires a largest iteration number in the compensation process.

The above-described embodiments are merely exemplary and the preprocessing filter and the common reception filter may be defined according to various methods, in addition to the above-described methods.

Unlike the embodiment described with reference to FIG. 13, the compensation process 1340 and 1350 using the unique channel of the RE and the preprocessing filter may be omitted according to channel correlation between REs. That is, if correlation between the reference RE and another RE is sufficiently high, the error of the primary signal detected using the common reception filter $B_1$ is relatively small. If influence of the error of the primary signal of the RE on performance of a final result is predicted to be low, the process of compensating for the primary signal is omitted and the primary signal is immediately input to a decoder 1370. That is, it is possible to reduce computational complexity and memory requirements necessary for the compensation process.

Figure 14:
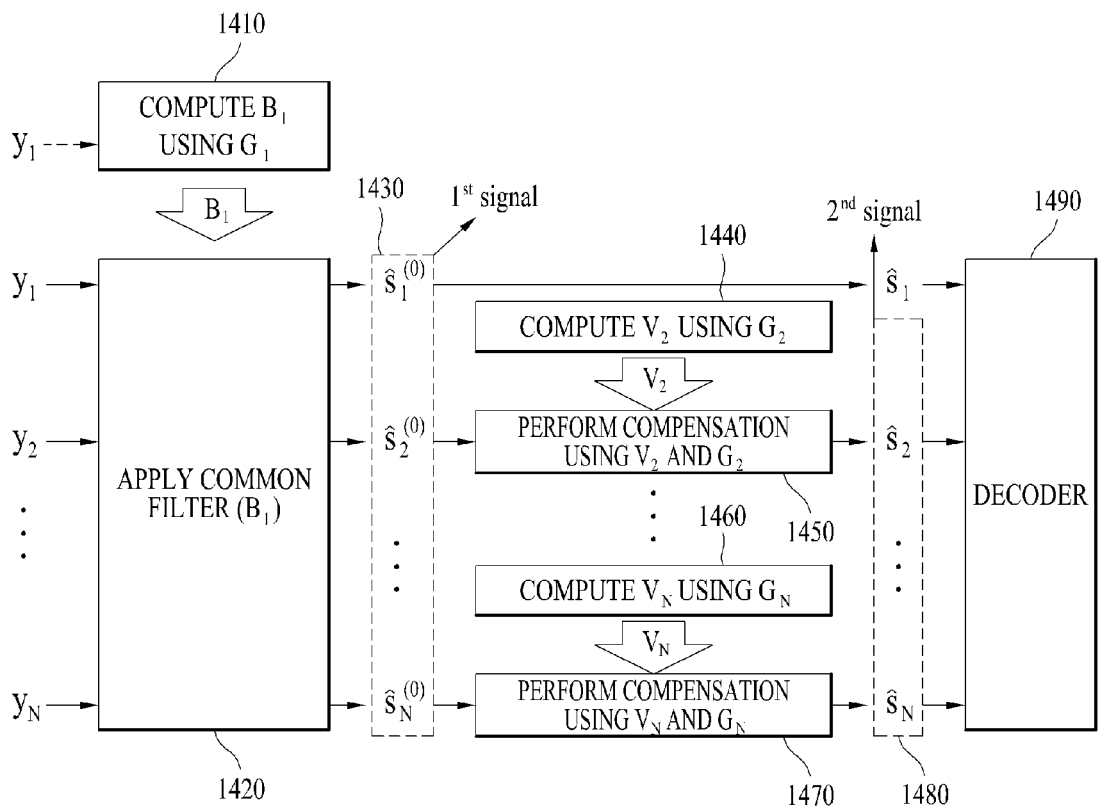
FIG. 14 is a diagram showing another MIMO receiver operational process related to the present invention.

FIG. 14 is a diagram showing another MIMO receiver operational process using a preprocessing filter. FIG. 14 is similar to FIG. 13 in that the common reception filter $B_1$ is used. However, in the embodiment of FIG. 14, the preprocessing filter $V_1$ is not computed based on the channel of the reference RE but the preprocessing filter of each RE is computed using the unique channel of each RE of the RE group. The process of compensating for the primary signal is performed using the preprocessing filter generated based on the unique channel of each RE instead of $V_1$.

More specifically, the MIMO receiver computes the common reception filter $B_1$ based on the channel of the reference RE (1410). $B_1$ is shared among the REs of the RE group and is used to generate the primary signal (1430). Prior to the process of compensating for the primary signal, the MIMO receiver generates a preprocessing filter based on the unique channel of each RE (1440 and 1460). That is, $V_2$ is computed based on $G_2$ with respect to a second RE (1440) and $V_N$ is computed based on $G_N$ with respect to an N-th RE.

The embodiments described with reference to FIGS. 8 to 13 are applicable to the process of the unique preprocessing filter of each RE. Subsequently, the MIMO receiver performs the compensation process based on the numerical analysis algorithm using the unique preprocessing filter generated with respect to each RE (1450 and 1470). The secondary signal generated through the compensation process (1480) is input to and processed in the decoder 1490.

According to the embodiment of FIG. 14, since the preprocessing filter is generated per RE, additional complexity is required. However, if channel correlation between REs is low, the iteration number of the compensation process increases in the embodiment in which the preprocessing filter is shared according to the methods of FIGS. 8 to 13. The embodiment in which the unique preprocessing filter is used as shown in FIG. 14 is more efficient at reducing complexity and a time required for a computational process.

Further, if the preprocessing filter is generated according to the Jacobi method, the Gauss-Siedel method and the SQR preconditioning method assuming the back substitution process, complexity increased in the process of computing the preprocessing filer is minimized and a large burden is not imposed on the MIMO receiver. If the lower triangular matrix having a size of N is subjected to the back substitution process, complexity is less than $N^2$.

Figure 15:
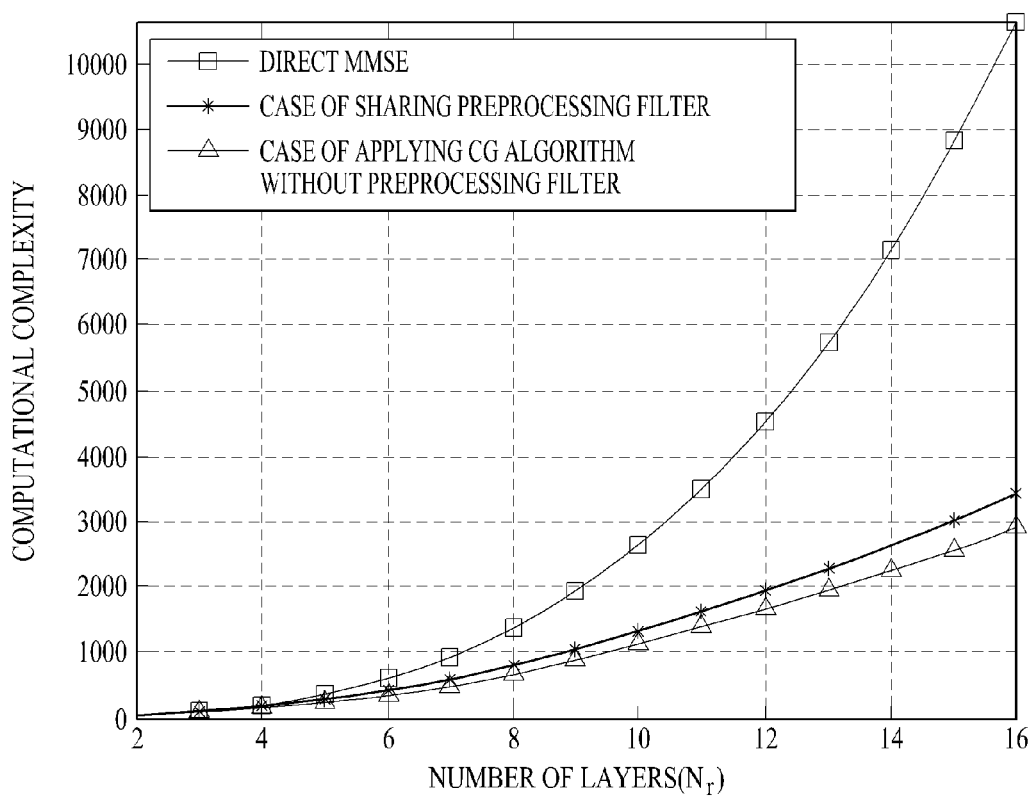
FIG. 15 is a graph showing comparison between computational complexities of signal detection processes related to the present invention.

FIG. 15 is a graph showing comparison between computational complexities of the prior art and the case of applying the preprocessing filter.

In the graph of FIG. 15, a curve denoted by a rectangle shows computational complexity when signals are detected with respect to all of the REs of the RE group using respective MMSE filters. A curve denoted by a star shows the case where the preprocessing filter $V_1$ is shared in the RE group and a curve denoted by a triangle shows the case in which $V_1$ is not shared in the RE group and the common reception filter $B_1$ is shared to perform the compensation process. In FIG. 15, it can be seen that the above-proposed MIMO receiver has higher complexity gain as the number of received streams increases.

According to the above-described embodiments, if correlation among all of the REs of the RE group is 1, the reception filter $B_I$ of each RE becomes equal to the reception filter $B_1$ of the reference RE. Accordingly, even when only $B_1$ is used, the primary signal may be input to the decoder without performance deterioration. Therefore, since only one reception filter is obtained with respect to the RE group, the total computational complexity is reduced to 1/N (N being the number of REs of the RE group).

If correlation among the REs of the RE group is less than 1, the error of the primary signal computed using the common reception filter $B_1$ is compensated for using the preprocessing filter $V_1$. As correlation between the REs increases, the compensation process of the numerical analysis algorithm using the preprocessing filter is rapidly performed (that is, the iteration number decreases). At this time, the compensation process using the preprocessing filter has higher computational complexity than the compensation process without the preprocessing filter but has a significantly lower iteration number than the compensation process without the preprocessing filter. As a result, the proposed MIMO receiver makes the best of the correlation between the REs, thereby reducing complexity while minimizing performance deterioration.

The MIMO receiver can further reduce computational complexity at the sacrifice of performance deterioration due to an error in the compensation process using the preprocessing filter, thereby providing a trade-off between computational complexity and performance.

In addition, according to the above-proposed method, the inverse matrix is not directly computed with respect to the REs except for the reference RE and all operations are performed by a matrix X vector operation. A distributed processing method is not easily applicable to the inverse matrix operation, but is easily applicable to the matrix X vector operation due to easy parallelization. Therefore, overall processing time can be rapidly reduced.

3. Method of Forming RE Groups of MIMO Receiver

The process of, at the MIMO receiver, processing the received signals using the preprocessing filter has been described above. Hereinafter, a process of, at the MIMO receiver, forming an RE group which is a unit for processing the received signals will be described.

First, the concepts of an RE group, a reference RE and a normal RE will be described. FIGS. 16 to 20 are diagrams showing a process of forming RE groups according to an embodiment of the present invention. Rectangles shown in FIGS. 16 to 20 indicate REs and hatched, patterned or colored rectangles indicate reference REs of RE groups. One or more REs form an RE group and the REs included in the RE group share a reception filter and/or a preprocessing filter generated based on the channel information of the reference RE. That is, the reception filter and/or the preprocessing filter of the reference RE are directly computed from the received signal (e.g., using the MMSE filter). Hereinafter, the REs except for the reference RE of the RE group are referred to as "normal REs".

Figure 16:
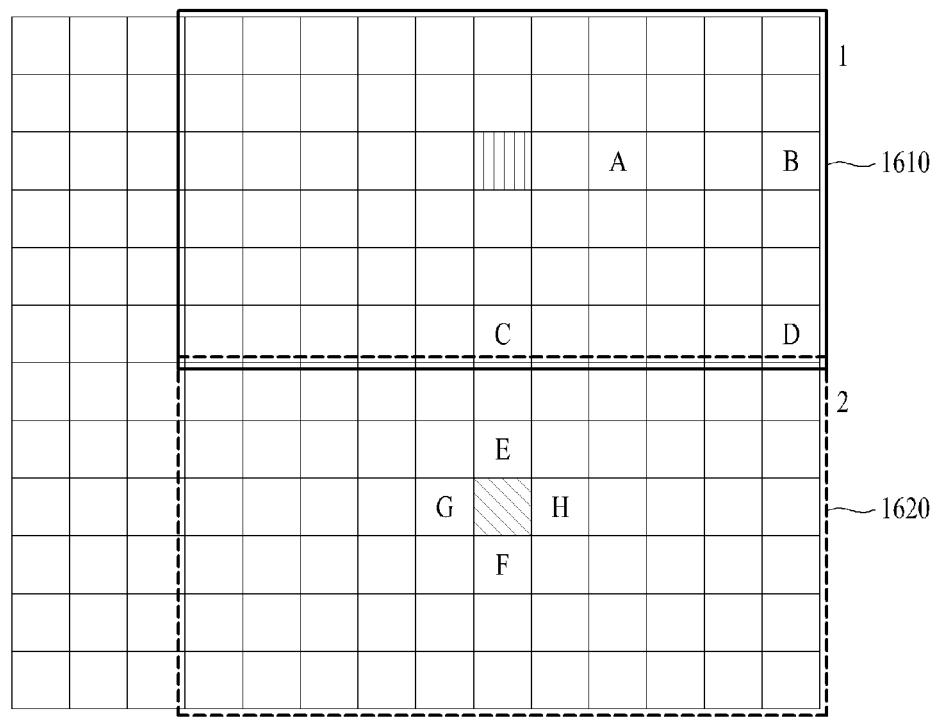
FIG. 16 is a diagram showing a process of forming RE groups related to the present invention.

For example, in FIG. 16, RE group #1 1610 include 11*6=66 REs and RE group #1 1610 is composed of one reference RE located at the center thereof and 65 normal REs. Similarly, RE group #2 1620 is composed of one reference RE and 65 normal REs. A distance from the reference RE to each normal RE is defined by coordinate values of {frequency axis, time axis} and, for example, a normal RE located at A in RE group #1 1610 may be expressed by {0, 2}. Normal REs located at B, C and D may be expressed by {0, 5}, {−3, 0} and {−3, 5}, respectively. Such coordinate values are obtained by determining the right and up directions of the RE group as frequency/time-axis increasing directions, which are merely exemplary.

In FIG. 16, each of two RE groups 1610 and 1620 includes 66 REs and all of the REs included in the two RE groups 1610 and 1620 are referred to as a "mother group". That is, hereinafter, the term "mother group" is a unit for processing a plurality of REs to form RE groups at the MIMO transmitter. In FIG. 16, the mother group is one resource block (RB) including 11*12=132 REs (in FIG. 16, the MIMO receiver processes an RB which is a mother group to form two RE groups.

In the embodiments shown in FIGS. 16 to 20, the same mother group is divided according to different methods to form RE groups. The mother group is not limited to the implementations of FIGS. 16 to 20 and the mother group may be defined in slot, subframe, subband or frame units in LTE/LTE-A, instead of the RB.

As described above, the MIMO receiver generates a reception filter and a preprocessing filter to be shared in an RE group based on the channel information of a reference RE and shares the generated filters among the normal REs to generate detection signals from the received signals. At this time, complexity of the reference RE required for reception filter, the preprocessing filter and data detection is expressed as shown in Equation 16 below.

$$Cpx_{RE\_DMMSE} = \frac{3}{2}N_sN_r(N_s+1) + N_s^3 \qquad \text{Equation 16}$$

In addition, complexity of the normal RE is expressed as shown in Equation 17 below.

$$Cpx_{RE\_Proposed}(\text{iter})=1/2N_sN_r(N_s+3)+4N_s^2+3/2N_s+ \\ (\text{iter}-1)(N_s^2+7/2N_s) \qquad \text{Equation 17}$$

From Equation 17, it can be seen that complexity required to generate the detection signal may be influenced by the iteration number of the algorithm. In addition, from Equations 16 and 17, total complexity required to process one mother group is expressed as shown in Equation 18 below.

$$Cpx_{Total} = N_{RE\ DMMSE} \times Cpx_{RE\ DMMSE} + \\ \sum_{iter=1}^{iter_{max}} N_{RE\ Proposed}(iter) \times Cpx_{RE\ Proposed}(iter) \qquad \text{Equation 18}$$

In Equation 18, $N_{RE\ DMMSE}$ denotes the number of reference REs located in the mother group and $N_{RE\ Proposed\ (iter)}$ denotes the number of normal REs, for which the iteration number of the numerical analysis algorithm is 'iter' in the mother group.

In RE group #1 1610 of FIG. 16, the iteration number for the normal RE located at B may be greater than the iteration number for the normal RE located at A. This is because effectiveness of the reception filter and/or the preprocessing filter shared in the RE group decreases as the distance from the reference RE increases and the iteration number of the numerical analysis algorithm for finding a value increases. In addition, as channel change increases (if a power delay spread profile is large or Doppler effect is large), effectiveness of the shared filters rapidly decreases. Accordingly, for a normal RE located far from the reference RE, if channel change is large, the iteration number of the algorithm significantly increases, significantly increasing total complexity $CPx_{Total}$ required to generate the detection signal.

Hereinafter, a method of minimizing complexity even when complexity required to generate the detection signal increases by describing various embodiments in which a MIMO receiver forms RE groups from a mother group will be proposed.

First, if the MIMO receiver uses RE groups #1 and #2 1610 and 1620 shown in FIG. 16 and channel correlation between REs is very high (for example, a pedestrian channel (3 km/h) if the length of a power delay spread profile is short and the Doppler effect has a small value), effectiveness of the reception filter and the preprocessing filter shared in the RE group is very high. Accordingly, the iteration number of the numerical analysis algorithm for all of the REs of the RE group may be 1 and computational complexity $CPx_{Total}$ required to process the mother group can be minimized.

In contrast, if channel correlation between REs is low, the numerical analysis algorithm needs to be iterated for normal REs located far from the reference RE. For example, assume that the iteration numbers for the REs located at A, B, C and D are 1, 2, 3 and 4, respectively. Increasing the number of normal REs having a large iteration number increases computational complexity of the RE group.

Figure 17:
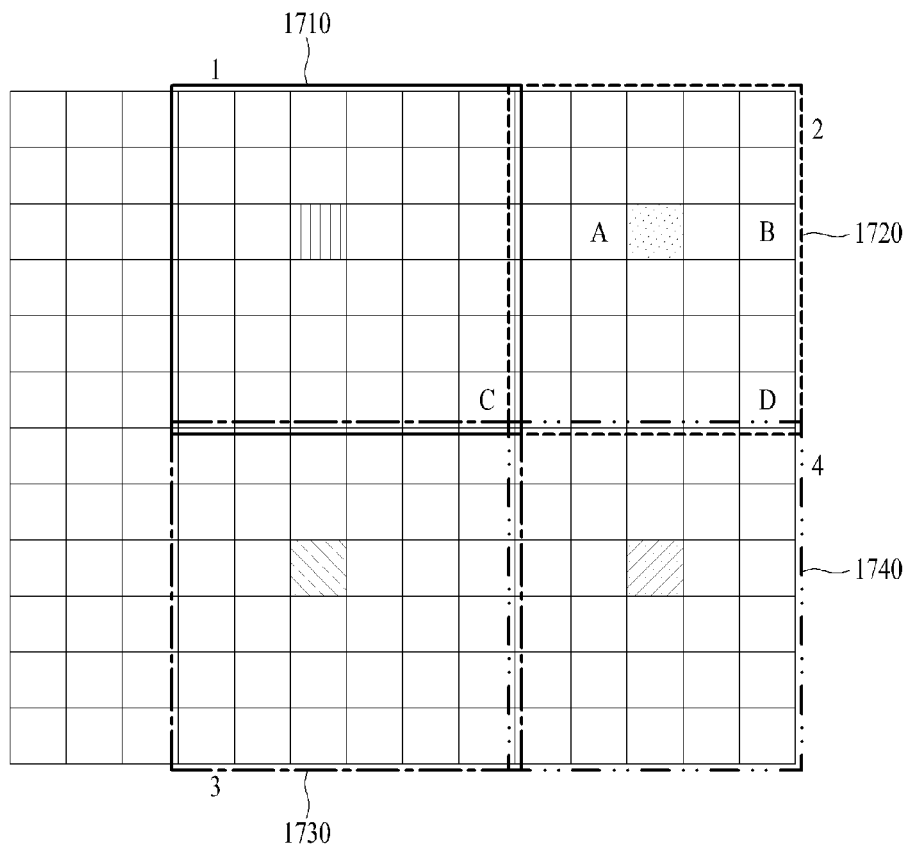
FIG. 17 is a diagram showing a process of forming RE groups related to the present invention.
Figure 18:
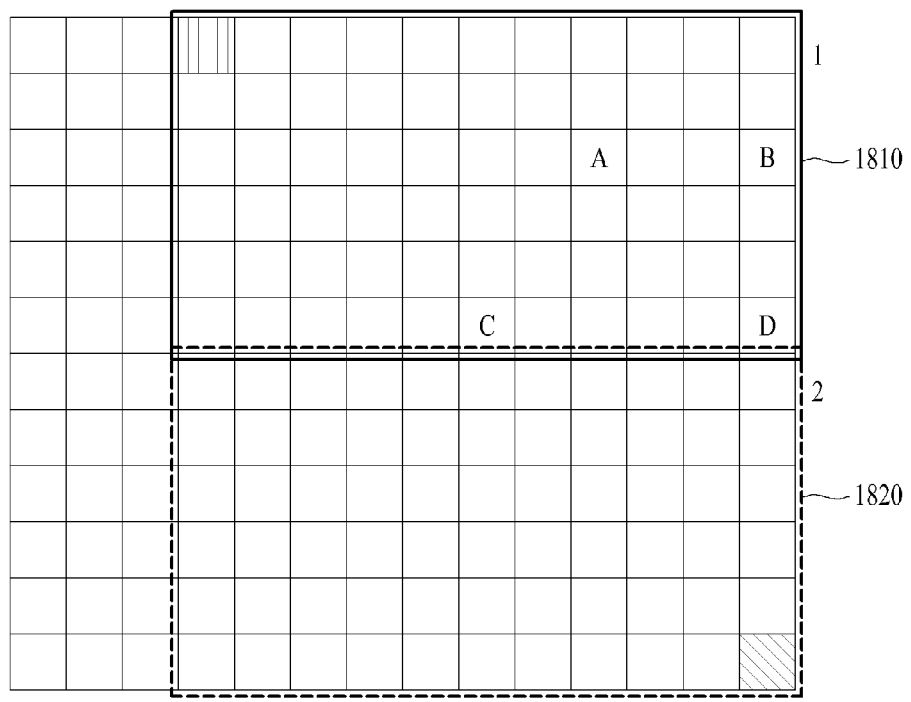
FIG. 18 is a diagram showing a process of forming RE groups related to the present invention.
Figure 19:
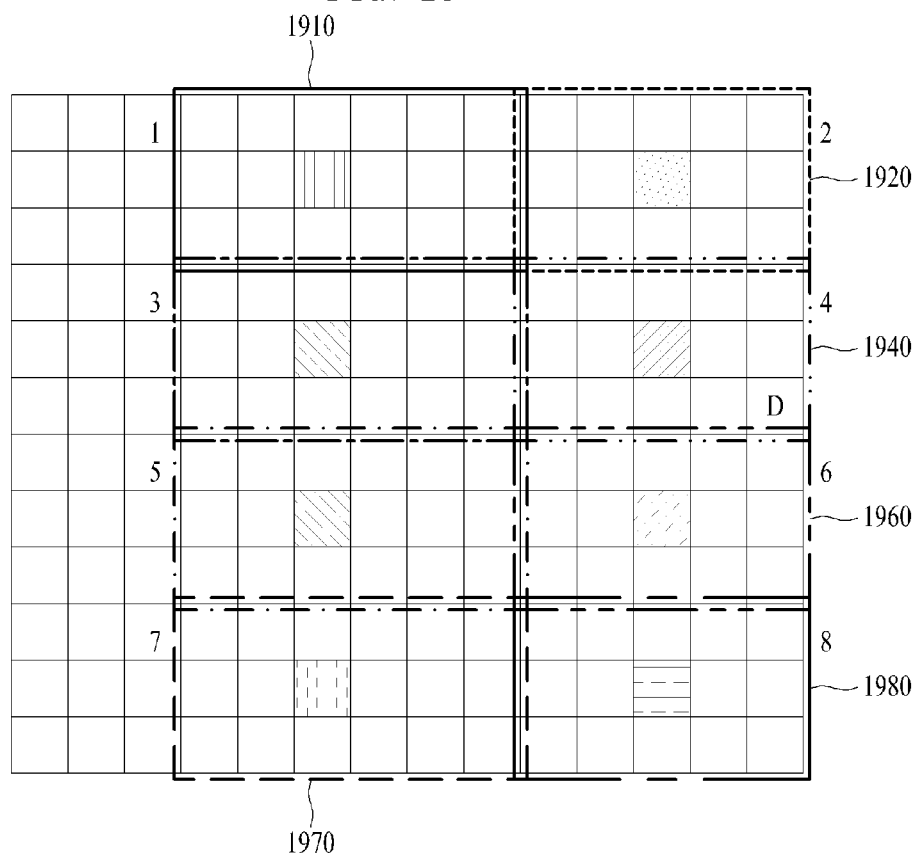
FIG. 19 is a diagram showing a process of forming RE groups related to the present invention.

In order to solve the problem that the number of normal REs having a large iteration number increases, for example, four RE groups 1710, 1720, 1730 and 1740 shown in FIG. 17 are assumed. Since the four RE groups 1710, 1720, 1730 and 1740 shown in FIG. 17 are equal to the embodiment of FIG. 16 in terms of the mother group, REs equal in number to the number of REs of the two RE groups 1610 and 1620 are included. However, in the four RE groups 1710, 1720, 1730 and 1740 shown in FIG. 17, a distance from the reference RE to a farthest normal RE in each RE group is shorter. Accordingly, the iteration numbers for some normal REs can be reduced.

For example, the distances between the normal REs located at A and B and the reference RE are respectively {0, 2} and {0, 5} in FIG. 16, whereas the distances between the normal REs located at A and B and the reference RE are respectively reduced to {0, 1} and {0, 2} in FIG. 17. In this case, the iteration numbers for arbitrary REs located at A, B, C and D can be reduced.

As a result, although the total number of reference REs increases from 2 to 4 in FIG. 17, total complexity required to process the mother group is reduced as compared to FIG. 16.

Figure 20:
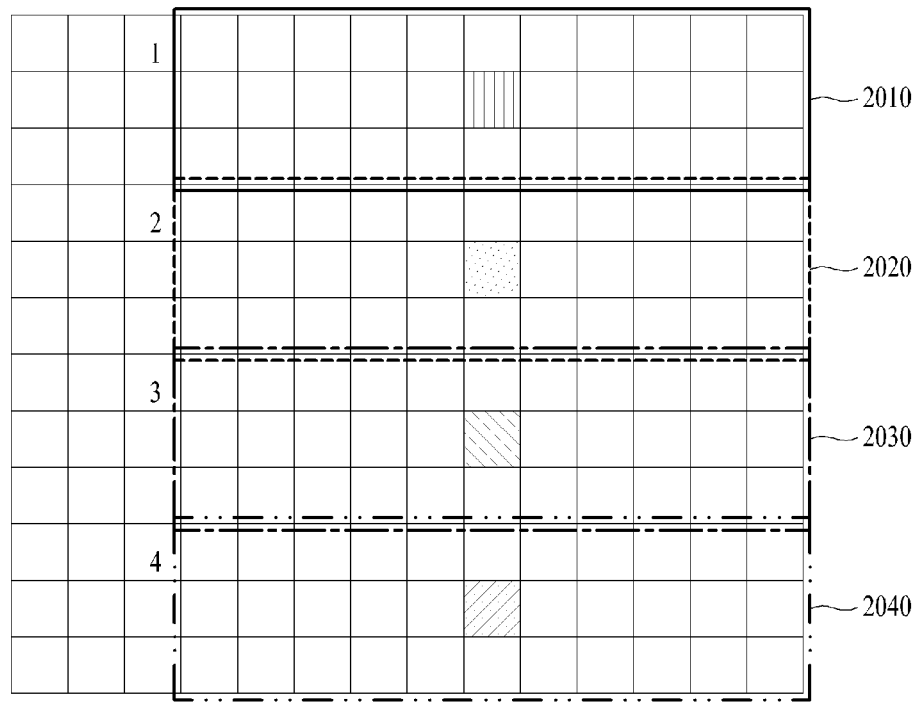
FIG. 20 is a diagram showing a process of forming RE groups related to the present invention.

From the above-described embodiment, the number of reference REs and the configuration of the RE group are determined so as to minimize $CPX_{Total}$ that is, computational complexity required to process all of the REs included in the mother group. The "configuration" of the RE group means the size and shape of the RE group. FIGS. 17 and 20 are equal in that the number of RE groups is 4 and are different in the shape thereof. Thus, the configurations of the RE groups are different from each other.

There are various methods of forming the RE groups. Hereinafter, embodiments in which RE groups are formed so as to minimize computational complexity of the mother group will be described.

First, the reference RE in the RE group is located at a place where a maximum distance from a normal RE is minimized. In other words, the reference RE should be located in the RE group such that a distance (that is, a maximum distance) between the reference RE to a farthest normal RE is minimized.

As described above, a distance between REs in the RE group may be expressed by {frequency axis, time axis} using two elements including a frequency axis and a time axis. The iteration number required to generate the detection signal of a normal RE far from the reference RE is equal to or greater than that of a normal RE close to the reference RE. Accordingly, if the reference RE is arranged according to the proposed method, it is possible to prevent the iteration number for a specific normal RE from rapidly increasing.

In RE group #1 1610 of FIG. 16, the maximum distance between the reference RE and the normal RE is {3, 5}. Even when any other RE of RE group #1 1610 is selected as a reference RE, this maximum distance cannot be reduced. In contrast, in FIG. 18, a reference RE is located at a corner of each RE group and a maximum distance is {5, 10}. Accordingly, the normal RE located at A of FIG. 18 requires a larger iteration number as compared to the normal RE located at the same position A of FIG. 16. Further, as channel correlation between REs in the RE group decreases, the iteration number significantly increases, the number of normal REs requiring a large iteration number rapidly increases, and total complexity $Cpx_{Total}$ increases. In conclusion, as described above, the reference RE should be located at a place where the maximum distance from a normal RE is minimized.

Next, the MIMO receiver may determine the configuration of the RE group based on channel correlation between REs. Channel correlation between REs has influence on the iteration number required to generate the detection signal of the normal RE, as described above. For example, if channel correlation between REs is high, the iteration number required for the MIMO receiver to detect data of the normal RE is small. In contrast, if channel correlation between REs is low, the iteration number required for the MIMO receiver to detect data from the normal RE under the same condition is large. This is because the MIMO receiver uses the reception filter and the preprocessing filter to detect data of the RE group and the effects of the shared filters increase as the channel correlation increases.

More specifically, the MIMO receiver knows channel information of all REs in advance and the channel correlation between REs may be computed according to Equation 19 based on the channel information of the REs.

$$\beta_k^{(f)} = \frac{1}{|C|} \sum_{l \in C} \frac{1}{2\|G_l^\dagger\|_F^2} (\|\text{diag}\{G_l^\dagger G_{l,k}^{(f)}\}\| + \|\text{diag}\{G_l^\dagger G_{l,-k}^f\}\|)$$

$$\beta_k^{(t)} = \frac{1}{|C|} \sum_{l \in C} \frac{1}{2\|G_l^\dagger\|_F^2} (\|\text{diag}\{G_l^\dagger G_{l,k}^{(t)}\}\| + \|\text{diag}\{G_l^\dagger G_{l,-k}^t\}\|)$$

Equation 19

In Equation 19, $\|\circ\|_F^2$ indicates the Frobenius norm according to the Frobenius method. In addition, a function diag(B) indicates a diagonal matrix obtained by extracting only the diagonal elements of a matrix B. C and |C| indicate the index set of an arbitrary RE which is used as a reference RE used to compute channel correlation in the RE group and the size of the index set, respectively. For example, in the embodiment of FIG. 16, C may indicate indices of two reference REs of RE group #1 1610 and RE group #2 1620 or indices of two arbitrary REs which are not reference REs. In addition, |C| is 2.

In FIG. 16, if the channel of the reference RE of RE group #2 1620 is $G_l, l \in C, G_{l,1}^{(f)}/G_{l,-1}^{(f)}$ indicate the channels of the normal REs located at E and F separated from the reference RE on the frequency axis by distances 1 and −1, respectively. Similarly, $G_{l,1}^{(t)}/G_{l,-1}^{(t)}$ indicate the channels of the normal REs located at G and H separated from the reference RE on the time axis by distances 1 and −1, respectively.

Meanwhile, $\beta_k^{(f)}$ indicates channel correlation between the reference RE $G_1$, $l \in C$ and the normal RE $G_{l,k}^{(f)}$ separated from the reference RE by k on the frequency axis. If the channels of $G_l$ and $G_{l,k}^{(f)}$ are the same, $\beta_k^{(f)}$ is 1 and, otherwise, is less than 1. The MIMO receiver may compute the channel correlation between REs along the frequency axis based on $\beta_k^{(f)}$ of Equation 19, and the maximum distance on the frequency axis in the RE group is determined according to the computed channel correlation and Equation 20 below.

$k=0, \beta_0^{(f)}=1$ while $\beta_k^{(f)} > \gamma$ do $k=k+1$ compute $\beta_k^{(f)}$ end while $k_{max}^{(f)}=k-1$  Equation 20

In Equation 20, $k_{max}^{(f)}$ denotes the maximum distance on the frequency axis, γ denotes a minimum threshold of $\beta_k^{(f)}$ which is the channel correlation between REs on the frequency axis and has a value less than 1. In Equation 20, if $\beta_k^{(f)}$ is less than γ, the maximum distance from the reference RE on the frequency axis is k−1, that is, $k_{max}^{(f)}=k-1$. Equation 20 means that up to an RE just before channel correlation with the reference RE becomes a minimum threshold is determined as an RE group in which the reception/preprocessing filter is shared. Both ends of the RE group on the frequency axis are determined according to Equation 20.

In Equation 19, channel correlation between REs on the time axis may be computed as $\beta_k^{(t)}$, and the maximum distance on the time axis is also determined through a method similar to Equation 20. Thus, both ends of the RE group on the time axis may be determined, and the configuration (that is, shape and size) of the RE group is finally determined when the maximum distances on the two axes are determined. That is, the reception/preprocessing filter is shared up to a distance where correlation with the reference RE becomes equal to or greater than the threshold on the frequency and time axis.

As another embodiment, the MIMO receiver may predict a power delay spread profile of a channel using a common reference signal (CRS). Such a power delay spread profile indicates the impulse response of the channel in the time domain and, as the length thereof increases, channel change on the frequency axis increases. The MIMO receiver may compute the maximum distance described in Equation 20 from the power delay spread profile of the channel.

More specifically, if the channel delay profile is very long, the maximum distance $k_{max}^{(f)}$ of Equation 20 may become 1. In contrast, if the channel delay profile is short, all the channels on the frequency axis become equal and the maximum distance may be set to 6. That is, the MIMO receiver may determine the maximum distance between the reference RE and the normal RE on the frequency axis using the channel delay profile.

In addition, the MIMO receiver supporting LTE/LTE-A may measure the Doppler effect and determine the maximum distance on the time axis using the Doppler effect similarly to the above-described power delay spread profile. As a result, the MIMO receiver may determine the configuration of the RE group using the power delay spread profile and the Doppler effect.

According to another embodiment, the MIMO receiver may determine an error allowable coefficient of the numerical analysis algorithm based on at least one of the signal to noise ratio (SNR)/signal to interference ratio (SIR)/signal to interference plus noise ratio (SINR) of the received signal and determine the configuration of the RE group. The error allowable coefficient $\delta$ of the numerical analysis algorithm was described above in Equation 11 and indicates the error allowable range of the computed result value of the numerical analysis algorithm.

Such an error means a difference between a result of direct computation using the MMSE filter for the normal RE and a result of computation using the shared reception/preprocessing filter according to the proposed method. Accordingly, as the error allowable coefficient $\delta$ increases, a probability of increasing an error of the result of computation increases and thus performance of the proposed MIMO receiver deteriorates. However, if the SNR/SIR/SINR is low, noise or interference dominantly influences on performance rather than the error. Accordingly, in this case, although the error allowable coefficient is large, performance deterioration of the receiver is relatively low. If the error allowable coefficient increases, the iteration number of the numerical analysis algorithm may be reduced, thereby reducing computational complexity required to generate the detection signal. If the error allowable coefficient is large, the iteration number of the numerical analysis algorithm for every RE may be reduced and a larger RE group may be formed as compared to the case where the error allowable coefficient is small.

More specifically, for example, in the case of an RE located at D in FIG. 16, if $\delta$=0.0001, the iteration number required for the numerical analysis algorithm is 4. In contrast, if $\delta$=0.01, the iteration number may be reduced to 2. Accordingly, if the SNR/SIR/SINR is not considered, the MIMO receiver should form the RE groups in the configuration shown in FIG. 17 instead of FIG. 16 in order to prevent the iteration number from becoming 4. In contrast, if the SNR/SIR/SINR is considered, the MIMO receiver may increase the error allowable coefficient $\delta$ to form the RE groups in the configuration shown in FIG. 16 if the SNR/SIR/SINR is low.

Further, the MIMO receiver may determine an average SINR per mother group and determine the error allowable coefficient of the mother group based on the average SINR as shown in Equation 21.

$$\delta = 10^{-SINR/5} \qquad \text{Equation 21}$$

Figure 21:
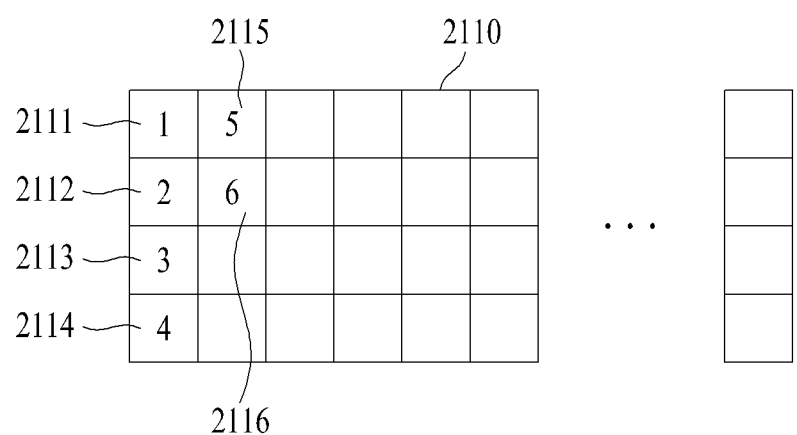
FIG. 21 is a diagram showing a process of forming RE groups related to the present invention.

For example, rectangles of FIG. 21 indicate mother groups 2110. Each of the mother groups 2111, 2112, 2113, 2114, 2114 and 2116 may be composed of a plurality of REs (e.g., an RB of FIGS. 16 to 20) and, in each mother group, RE groups may be formed in the configurations of FIGS. 16 to 20.

In FIG. 21, as a result of processing mother group #1 2111, an SINR may be 10 dB. In this case, the MIMO receiver determines $\delta$=0.01 with respect to mother group #1 2111 and forms RE groups in the configuration shown in FIG. 17. Subsequently, if the SINR is 15 dB as a result of processing mother group #2 2112, the MIMO receiver may determine $\delta$=0.001 and form smaller RE groups in the configuration of FIG. 19. Subsequently, if the SINR is 5 dB as a result of processing mother group #3 2113, the MIMO receiver may determine $\delta$=0.1 and form RE groups in the configuration of FIG. 16. As a result, the MIMO receiver may actively determine the configuration of the RE group according to the SINR measured per mother group, thereby additionally reducing computational complexity required to process the received signal.

As another embodiment which uses the SNR/SIR/SINR, the MIMO receiver may determine a minimum threshold $\gamma$ of the channel correlation in consideration of the SNR/SIR/SINR. The minimum threshold $\gamma$ means minimum correlation satisfied by the RE in order to share the reception/preprocessing filter based on the reference RE, as described in Equation 20.

The MIMO receiver may decrease the minimum threshold of the channel correlation if the SNR/SIR/SINR is low. In this case, the algorithm of Equation 20 may select a larger maximum distance $k_{max}^{(f)}$ from the reference RE, thereby forming a larger RE group. In contrast, if the SNR/SIR/SINR is high, the MIMO receiver may increase the minimum threshold. The algorithm of Equation 20 selects a smaller maximum distance, thereby forming a smaller RE group.

As another embodiment, if the mother group is an RB, the MIMO receiver may determine RE groups in RB units and form RE groups in consideration of the iteration number of a previous RB. The MIMO receiver may form RE groups each having a size less than that of RE groups applied to the previous RB with respect to a next RB, if the iteration number of the numerical analysis algorithm exceeds a specific threshold in a process of generating detection signals of the previous RB.

More specifically, a specific threshold for the iteration number of the numerical analysis algorithm is $\chi$. For example, when two RE groups are formed with respect to the RB as shown in FIG. 16, the case where the iteration number of the numerical analysis algorithm exceeds the threshold χ in the process of generating the detection signal of the normal RE located at D of FIG. 16 may be considered. At this time, the MIMO receiver forms smaller RE groups in the configuration shown in FIG. 17 with respect to the next RB. When the smaller RE groups are formed, the distance between the normal RE located at D and the reference RE is reduced from {3, 5} to {3, 2} and the iteration number of the numerical analysis algorithm is reduced.

In contrast, if the iteration number does not exceed the threshold χ in the process of generating the detection signals of the RE groups shown in FIG. 16, the RE groups having the configuration shown in FIG. 16 are continuously applicable to a next RB. As a result, the MIMO receiver may reduce the RE group depending on whether the iteration number of the numerical analysis algorithm for the previous RB exceeds the threshold in the process of forming RE groups in RB units.

Reducing the RE group may mean any one of reduction in the frequency-axis direction, reduction in the time-axis direction and reduction in the frequency- and time-axis directions. In the embodiment of FIG. 16, if the iteration number of the normal RE located at D of FIG. 16 exceeds the threshold χ, the MIMO receiver may compare the convergence speed of the normal RE located at C (the error of the case in which the common filter is not used) with the convergence speed of the normal RE located at B. If the convergence speed of the normal RE located at C is higher than that of the normal RE located at B (that is, the error is low), the channel correlation between the reference RE and the RE located at C is greater than the channel correlation between the reference RE and the RE located at B.

Therefore, the MIMO receiver may form the RE groups having the configuration shown in FIG. 17 in which the reference REs are further provided in the time-axis direction with respect to the next RB (to further provide the reference REs at positions closer to B). In contrast, if the convergence speed of the normal RE located at C is lower (that is, the error is higher), the channel correlation between the reference RE and the RE located at C is less than the channel correlation between the reference RE and the RE located at B. Therefore, the MIMO receiver may form RE groups having the configuration shown in FIG. 20 with respect to the next RB (to further provide the reference REs at a position closer to C).

The method of controlling the configuration of the RE group in consideration of the convergence speed may be understood as considering the iteration number of the numerical analysis algorithm. Meanwhile, a high convergence speed (a higher speed for reducing the error per iteration number) means that the iteration number required to generate the detection signal is small.

The convergence speed (that is, the error of the case where the common filter is not used) may be confirmed by computing $\|g^{(i)}\|$ (that is, the gradient) of "while $\|g^{(i)}\| > \delta \|g^{(0)}\|$ do" of the numerical analysis algorithm described in Equation 11. In other words, as $\|g^{(i)}\|$ decreases with respect to the same iteration number i, the convergence speed increases (that is, the error decreases). Therefore, by comparing $\|g^{(i)}\|$ of the RE located at C and $\|g^{(i)}\|$ of the RE located at D, the convergence speeds of the two REs may be compared.

The embodiment in which the MIMO receiver compares the iteration number of the numerical analysis algorithm and the error to determine the configuration of the next RE group has been described above. Hereinafter, in addition to the above description, an embodiment in which the MIMO receiver predetermines the configuration of the next RE group using channel correlation between REs will be described.

The process of, at the MIMO receiver, measuring channel correlation for the frequency axis and the time axis was described using Equation 19. If the channel correlation in the frequency-axis direction is less than that in the time-axis direction (that is, if channel change in the frequency-axis direction is larger), an RE group in which a maximum distance in the frequency-axis direction is reduced may be selected. In contrast, if the channel correlation in the time-axis direction is less than that in the frequency-axis direction (that is, if channel change in the time-axis direction is larger), an RE group in which a maximum distance in the time-axis direction is reduced may be selected. According to this embodiment, by reducing the maximum distance in the axis direction in which the iteration number of the numerical analysis algorithm is large due to low channel correlation, it is possible to reduce computational complexity of all of the RE groups with respect to the next RB.

For example, if $$\beta^{(f)}_{k^{(f)}_{max}} > \beta^{(t)}_{k^{(t)}_{max}}$$

is satisfied while the maximum iteration number of the numerical analysis algorithm exceeds χ while the RE group having the configuration shown in FIG. 16 is used, the MIMO receiver may form the RE groups having the configuration shown in FIG. 17 with respect to a next RB. In contrast, if $$\beta^{(f)}_{k^{(f)}_{max}} < \beta^{(t)}_{k^{(t)}_{max}}$$

is satisfied, the RE groups having the configuration shown in FIG. 20 may be formed.

The embodiment in which the MIMO receiver compares the maximum iteration number with the threshold χ may be changed as follows.

Contrary to the embodiment in which the RE group is reduced, if the maximum iteration number of the numerical analysis algorithm in the process of detecting the data of the previous RB is less than the specific threshold, the MIMO receiver may enlarge the RE group with respect to the next RB. That is, if the channel correlation is sufficiently good, the iteration number of the numerical analysis algorithm does not significantly increase even when the RE group is enlarged. Therefore, the MIMO receiver may enlarge the RE group in order to reduce the computational complexity of the reference RE.

Further, if the maximum iteration number of the numerical analysis algorithm for the previous RB is less than the specific threshold, the MIMO receiver compares convergence speed in the frequency-axis direction with the convergence speed in the time-axis direction to determine the configuration of the RE group to be enlarged. In addition, the MIMO receiver may compare channel correlations on the frequency axis and the time axis to determine the configuration of the RE group to be enlarged. The embodiment in which the RE group is enlarged is similarly applicable to the embodiment in which the RE group is reduced and thus a detailed description thereof will be omitted.

If the RE group is enlarged in consideration of the iteration number of the previous RB, the MIMO receiver may enlarge the RE group to be returned to the unreduced RE group. That is, if the MIMO receiver has reduced the RE group in consideration of the iteration number for the RB group, enlarging the RE group may mean that the RE group is returned to the unreduced RE group.

FIG. 21 is a diagram showing a process of forming RE groups according to an embodiment of the present invention. In FIG. 21, each rectangle indicates an RB and each RB includes a plurality of REs shown in FIGS. 16 to 20 and is composed of one or more RE groups. One or more of the embodiments described with reference to FIGS. 16 to 20 are combined and applicable and thus the MIMO receiver can minimize the computational complexity of each RB.

For example, first, the MIMO receiver determines the configuration of the RE group in consideration of the channel correlation according to the frequency axis and the time axis with respect to RB #1 2111. When data detection of RB #1 2111 is finished, the MIMO receiver may predetermine the configuration of the RB group to be used in RB #2 2112 based on the convergence speed and the iteration number of the numerical analysis algorithm for RB #1 2111. Similarly, the configuration of the RE group of RB #3 2113 may be determined based on the result of the numerical analysis algorithm for RB #2 2112.

That is, the configuration of the RE group to be used in the next RB may be determined based on the convergence speed and the iteration number of the numerical analysis algorithm for the previous RB and the RE group of a first RB may be determined in consideration of channel correlation between REs and/or SNR/SIR/SINR. The MIMO receiver may form RE groups in subframe or timeslot units in addition to RB units.

As described above, the MIMO may adaptively determine the configuration of the RE group in consideration of channel correlation between REs, an SNR/SIR/SINR and previous operation history. Since the RE group is adaptively determined, the MIMO receiver can reduce computational complexity required to process all RBs without performance deterioration.

4. Proposed Method of Operating MIMO Transmitter

The process of, at the MIMO receiver, forming the RE groups to process the received signals has been described above. Hereinafter, an embodiment in which a MIMO transmitter forms RE groups from a mother group will be described with reference to FIGS. 22 and 23. Hereinafter, the MIMO transmitter may mean the base station or the transmitter described in the beginning of this specification and may perform communication with the MIMO receiver.

First, the MIMO transmitter determines the configurations of the RE groups from one mother group in consideration of channel correlation among the plurality of REs on a time axis and channel correlation among the plurality of REs on a frequency axis. That is, the MIMO transmitter may directly determine the RE groups (that is, the configurations of the RE groups) to be used for the MIMO receiver to generate the detection signals. Subsequently, the MIMO transmitter transmits information on the configurations of the RE groups to the MIMO receiver and the MIMO receiver processes the received signals based on such information to generate the detection signals. Hereinafter, the process of, at the MIMO transmitter, of forming the RE groups will be described in detail.

That is, the MIMO transmitter may perform the process of determining the configurations of the RE groups before the MIMO receiver processes the received signals. When the configurations of the RE groups is determined by the MIMO transmitter, the information is transmitted from the MIMO transmitter to the MIMO receiver. The information on the RE group transmitted by the MIMO transmitter may be transmitted to the MIMO receiver through a physical downlink control channel (PDCCH). According to the above-described process, since the MIMO receiver may omit the process of determining the configurations of the RE groups, it is possible to improve implementation complexity of the UE and to reduce power consumption of the UE.

If the MIMO transmitter and the MIMO receiver communicate with each other in a time division duplex (TDD) system, the MIMO transmitter may know an effective channel in advance. In this case, the MIMO transmitter may perform the process of computing channel correlation among the plurality of REs according to the process described in Equation 20. Through Equation 20, the MIMO transmitter may determine a maximum distance on the frequency axis $k_{max}^{(f)}$ and a maximum distance on the time axis $k_{max}^{(t)}$. That is, if the maximum distances on the frequency and time axes are determined, the MIMO transmitter determines the configurations of the RE groups. Information on the formed RE groups (e.g., the configurations of the RE groups) is transmitted to the MIMO receiver.

In contrast, if the MIMO transmitter and the MIMO receiver communicate with each other in a frequency division duplex (FDD) system, it is difficult for the MIMO transmitter to directly know the effective channel. In this case, the MIMO transmitter may receive information on channel correlation between the REs on the frequency and time axes or information on the power delay spread profile and the Doppler effect fed back by the MIMO receiver. In other words, the MIMO transmitter may receive parameter values for forming the RE groups fed back by the MIMO receiver and form the RE groups using the received information. Examples of the fed-back information include information on the Doppler effect which is a characteristic value of a specific frequency domain, a power delay spread profile, coherence time, and coherence bandwidth and may include information on the index of a preferred frequency domain of the MIMO receiver, the order of the preference frequency domain and preference of each frequency domain as preference information of the frequency domain according to time/frequency correlation. The MIMO transmitter forms the RE groups based on at least one of the fed-back information.

Subsequently, embodiments in which a MIMO transmitter forms RE groups from one mother group and then transmits information on the RE groups to a MIMO receiver will be described.

First, the configurations of the RE groups predetermined between the MIMO transmitter and the MIMO receiver may be shared. That is, the MIMO transmitter may select any one of the predetermined configurations of the RE groups and transmit the selected RE group to the MIMO receiver as an index value. Since the MIMO receiver has information on the configurations of the RE groups, it is possible to determine in which configuration the RE groups are formed using the index value received from the MIMO transmitter.

Figure 22:
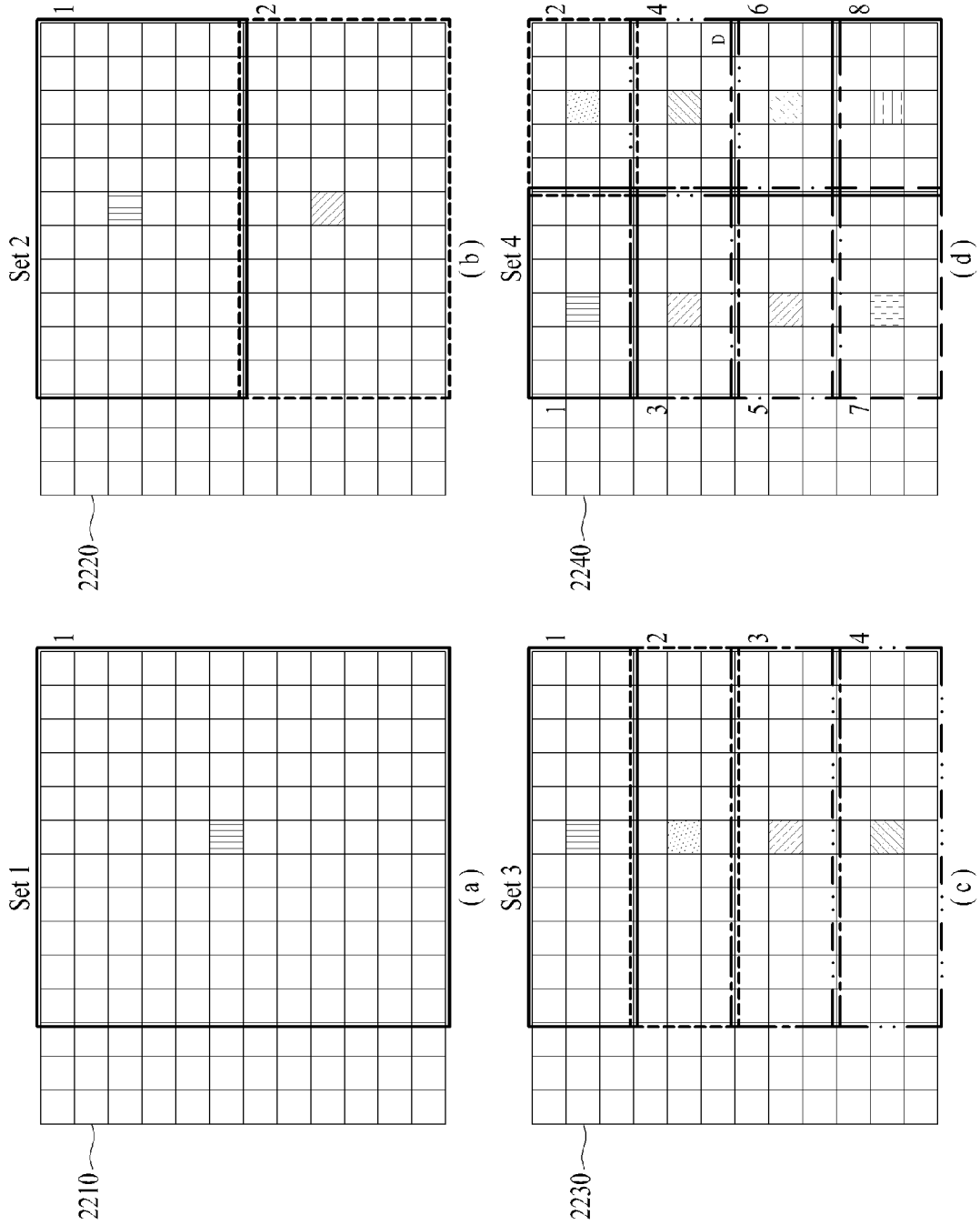
FIG. 22 is a diagram showing a process of forming RE groups related to one embodiment the present invention.

Referring to FIG. 22, the MIMO transmitter and the MIMO receiver share information indicating that the configuration of the RE group is any one of set #1 2210, set #2 2220, set #3 2230 and set #4 2240. At this time, each set shows that one mother group includes RE groups having a specific configuration. According to the above-described embodiment, the MIMO transmitter selects any one of the predetermined four sets based on $k_{max}^{(f)}$ and $k_{max}^{(t)}$ and transmits information on the selected set to the MIMO receiver. In FIG. 22, assume that the mother groups of the four sets are the same. At this time, although a unit (e.g., one RB) forming one mother group is an RB in LTE/LTE-A in this description, the unit forming one mother group is not limited thereto and may be implemented by a subframe, a slot or a unit defined in a new communication system.

Numerals shown in FIG. 22 indicate the indices of the RE groups in the mother group. For convenience of description, hereinafter, a specific set and a specific RE group in the set are expressed by {set index, RE group index}. That is, {3, 1} means a third RE group denoted by "3" in set 3 (2230).

Second, the MIMO transmitter may signal the index value of a newly selected set based on the index value of a previously selected set. That is, in the above-described embodiment, the MIMO transmitter transmitted the index value directly indicating the configuration of the RE group. Alternatively, the MIMO transmits may compare the configuration of the newly formed RE group with the configuration of the previously formed RE groups and transmit only a result of comparison to the MIMO receiver.

More specifically, channel correlation between the REs on time/frequency axis is determined by the long-term statistical elements (e.g., the power delay spread profile or the Doppler effect). Such long-term statistical elements are significantly influenced by the movement speed of the UE and carrier selection. Accordingly, if the UE uses the same carrier and mobility thereof is low, channel correlation is slowly changed with time. In this case, the configuration of the previously selected RE group and the configuration of the newly selected RE group of the MIMO transmitter are highly likely to be similar. That is, the MIMO transmitter transmits only the result of comparison with the configuration of the previous RE group, thereby minimizing overhead of the information transmitted to the MIMO receiver.

For example, if the configuration of the RE group previously selected between the MIMO transmitter and the MIMO receiver is known in advance, the MIMO transmitter may inform the MIMO receiver whether the configuration of the RE group selected previously is reused using only 1-bit information as shown in Table 1 below.

TABLE 1

| Index | Information |
|---|---|
| 0 | maintained |
| 1 | reset |

If the MIMO transmitter transmits "1", the MIMO receiver no longer uses the configuration of the RE group used previously. Instead, the MIMO transmitter transmits the index value indicating the configuration of a new RE group to the MIMO receiver. In contrast, if the MIMO transmitter transmits "0", the MOMO receiver may recognize that the configuration of the RE group used previously is continuously used.

As another example, the MIMO transmitter may signal the configuration of the RE selected newly as a relative value using 2-bit information, as shown in Table 2 below.

TABLE 2

| Index | Information |
|---|---|
| 00 | maintained |
| 01 | −1 (enlarged) |

TABLE 2-continued

| Index | Information |
|---|---|
| 10 | +1 (reduced) |
| 11 | Reset or reserved |

In table 2, if the configuration of the RE group previously selected between the MIMO transmitter and the MIMO receiver is set #3 2230 and the configuration of the RE group selected newly is set #4 2240, the MIMO transmitter transmits "10". The MIMO receiver may recognize that the set index increases by 1 and the configuration of the RE group is substantially reduced, when receiving "10". If the configuration of the RE group selected newly is set #2 2220, the MIMO transmitter transmits "01". If the channel state is rapidly changed and thus set #1 2210 is newly selected, the MIMO transmitter transmits "11" and directly informs the MIMO receiver of the index value of set #1 2110. Alternatively, the MIMO transmitter transmits "11" and does not inform the MIMO receiver of the index value of the newly selected set. Instead, the MIMO receiver, which has received "11", directly forms the RE groups according to the above-described embodiments. At this time, the MIMO transmitter implicitly estimates that the MIMO receiver has selected set #1. Subsequently, the MIMO transmitter informs the MIMO receiver of the configuration of the RE group using Table 2 based on the implicitly selected set #1.

According to the embodiments described in Tables 1 and 2, if the channel state is rapidly changed to reset the RE group information, the MIMO transmitter should directly transmit the index value indicating the new RE group set. In order to lessen such a burden, the MIMO transmitter may transmit only information on change in channel correlation to the MIMO receiver as shown in Table 3 below.

TABLE 3

| Index | Information |
|---|---|
| 0 | Channel correlation decreases. |
| 1 | Channel correlation increases. |

When the information according to Table 3 is received, the MIMO receiver determines the configuration of the RE group to be used newly in consideration of the configuration of the RE group used previously and change in channel correlation. For example, the case where the MIMO receiver receives "0" from the MIMO transmitter while selecting and using set #3 2230 of FIG. 22 will be described. It can be seen that the iteration number of the numerical analysis algorithm for generating the detection signal of a specific RE exceeds a threshold while the MIMO receiver preferentially applies set #3 2230 to form RE groups and process the received signal. In this case, the MIMO receiver applies set #3 2230 to up to the RE group, to which the RE belongs, to form the RE groups and applies set #4 2240 to subsequent RE groups thereof to form the RE groups. That is, if the iteration number required to generate the detection signal exceeds the threshold while the MIMO receiver processes the RE of {3, 2}, set #4 2240 is selected to form the RE groups in the configuration of {4, 5} and {4, 6} upon processing the RE of {3, 3} and subsequent REs thereof. Subsequently, the MIMO receiver may select set #4 2240 with respect to the remaining REs to process the received signal in the configuration of {4, 7} and {4, 8}. In contrast, when the MIMO receiver receives "1" from the MIMO transmitter, the RE groups may be formed based on the existing set to process the received signal. At this time, if the iteration number of the process of processing the received signal is remarkably reduced, the MIMO receiver may change set #3 to set #2 and process the received signal. For example, if this situation occurs in {3, 2}, the RE groups of {3, 3} and {3, 4} may be changed to the configuration of {2, 2} and then processed.

Third, the MIMO transmitter may periodically or aperiodically inform the MIMO receiver of information on the RE group. The MIMO transmitter of the above-described second embodiment transmits information on the configuration of a new RE group expressed by a relation with the configuration (that is, set) of the RE group selected previously to the MIMO transmitter. In the present embodiment, the MIMO transmitter directly informs the MIMO receiver of information on the configuration of the RE group periodically or aperiodically. Therefore, the MIMO receiver may form the RE group according to the embodiment described in Chapter 3 in a period in which the information on the RE group is not received.

For aperiodic transmission, the MIMO transmitter may transmit the information on the RE group to the MIMO receiver in the following cases: for example, if the MIMO transmitter first transmits data to the MIMO receiver, if the number of layers or ranks is changed, if a serviced carrier or RB is changed, if the MIMO receiver directly requests information on the RE group through a trigger message, etc. If the MIMO receiver requests the information on the RE group through the trigger message, the trigger message may be transmitted through a physical uplink control channel (PUCCH).

The MIMO transmitter may use a control frame to transmit the information on the RE group to the MIMO receiver. The control frame indicates a time when the information on the RE group is transmitted and may be periodically or aperiodically transmitted to the MIMO receiver. If the control frame is periodically transmitted, a time when the information on the RE group is transmitted is fixed within the period. In contrast, if the control frame is aperiodically transmitted, a time when the information on the RE group is transmitted is fixed until a new control frame is transmitted. At this time, the latter may be used when the MIMO transmitter changes the time when the information on the RE group is transmitted.

Equation 22 below is an example of configuring the control frame and $CF_1$, $CF_2$ and $CF_3$ denote different control frames. In the control frame, each element means one mother group processing unit (e.g., RB, frame, subframe, slot, etc.), "1" means that the MIMO transmitter directly transmits grouping information of a mother group, and "0" means that the MIMO transmitter does not transmit the grouping information and thus the MIMO receiver directly forms the RE groups. At this time, the MIMO receiver uses the grouping information previously determined by the MIMO transmitter, without directly forming the RE groups.

$$CF_1=\{1,0,1,0,1,0,1,0,1\}$$

$$CF_2=\{1,0,0,0,0,1,0,0,0,1\}$$

$$CF_3=\{1,0,0,0,0,0,0,0,0\} \quad \text{Equation 22}$$

The MIMO transmitter transmits $CF_1$ to more frequently transmit the information on the RE group to the MIMO receiver if channel correlation is rapidly changed and transmits $CF_3$ to less frequently transmit the information on the RE group to the MIMO receiver if channel correlation is slowly changed.

Up to now, the embodiment in which the MIMO transmitter transmits the information on the RE group to the MIMO receiver has been described. Even in the proposed embodiment, the MIMO receiver may directly form the RE groups. In this case, the MIMO receiver may ignore the received information on the RE group and autonomously form the RE groups. If the MIMO receiver forms RE groups in the configuration different from that instructed by the MIMO transmitter, the MIMO receiver feeds such information back to the MIMO transmitter.

That is, the MIMO receiver may sense that the iteration number of the numerical analysis algorithm for some REs exceeds a threshold in the process of generating the detection signals according to the configuration of the RE group instructed by the MIMO transmitter. In this case, the MIMO receiver determines that the configuration of the RE group instructed by the MIMO transmitter is not appropriate and directly forms the RE groups according to the method proposed in Chapter 3. Subsequently, the MIMO receiver transmits the information on the configuration of the RE groups formed thereby to the MIMO transmitter such that the MIMO transmitter confirms the process of forming the new RE groups. Such feedback information may be delivered through a physical uplink control channel (PUCCH).

For example, assume that the threshold of the iteration number of the numerical analysis algorithm allowed by the MIMO receiver is 2. In the process, at the MIMO receiver, forming the RE groups according to the information received from the MIMO transmitter and detecting data, the result values of some REs may not satisfy an allowable error range.

In this case, the MIMO receiver may additionally and iteratively perform the numerical analysis algorithm to detect the data until the result values within the allowable error range are acquired. The MIMO receiver may accumulate the number of REs, for which the result value within the allowable error range is not acquired, and directly form the RE groups if the accumulated number exceeds an arbitrary number. Alternatively, when the result value within the allowable error range is not acquired, the MIMO receiver may immediately feed such information back to the MIMO transmitter. Such feedback information is shown as shown in Table 4 below.

TABLE 4

| Index | Information |
|---|---|
| 00 | Maintained |
| 01 | Frequency |
| 10 | Time |
| 11 | Frequency/time |

That is, as the result of detecting the data according to the configuration of the RE group transmitted by the MIMO transmitter, if a signal is detected within an error range, the MIMO receiver transmits "00". In contrast, if the RE group needs to be enlarged on the frequency axis or the time axis as the result of generating the detection signal of the MIMO receiver, the MIMO receiver may transmit "01" or "10". If the RE group needs to be enlarged on the two axes, "11" may be transmitted.

Based on the information fed back by the MIMO receiver, the MIMO transmitter may determine the configuration of the RE group to be formed newly. For example, assume that the MIMO transmitter selects set #3 2230 of FIG. 22 and informs the MIMO receiver of set #3 2230 and the MIMO receiver feeds back "01". In this case, the MIMO transmitter may inform the MIMO receiver of set #4 2240 upon selecting a next set in consideration of the feedback of the MIMO receiver, even when set #3 2230 is selected.

Figure 23:
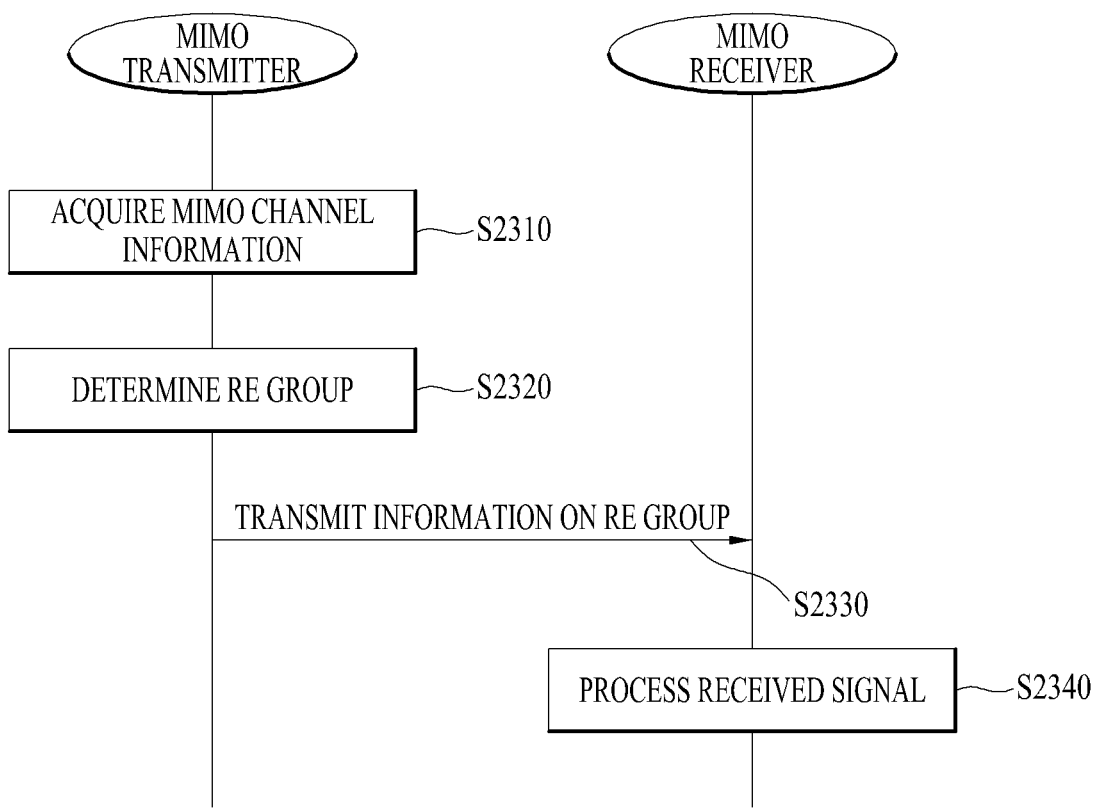
FIG. 23 is a diagram showing a method of processing a transmitted signal related to one embodiment of the present invention.

FIG. 23 is a flowchart illustrating the RE group forming method of the MIMO transmitter in time series. Accordingly, although the detailed description is omitted in FIG. 23, those skilled in the art may easily understand that the above description is applicable equally or similarly.

First, the MIMO transmitter acquires MIMO channel information (S2310). In a TDD system, the MIMO transmitter may directly know the channel information. In the FDD system, the MIMO transmitter may acquire the channel information by analyzing the information fed back by the MIMO receiver.

Subsequently, the MIMO transmitter determines the configuration of the RE group (S2320). That is, the MIMO transmitter determines the configuration of the RE group to be used to generate the detection signals. In the process of determining the RE group, channel correlation between the REs may be used. The channel correlation may be computed in consideration of the channel information acquired in S2310.

When the configuration of the RE group is determined, the MIMO transmitter transmits the information on the configuration of the RE group to the MIMO receiver (S2330). The method of transmitting the information on the RE group includes the method of transmitting the index value of the configuration of the RE group determined previously and the method of transmitting the index value indicating the relation with the configuration of a previous RE group as described above. Such a transmission process may be performed periodically or aperiodically.

The MIMO receiver, which has received the information on the RE group, processes the received signals based on the information to generate the detection signals (S2340). If the configuration of the RE group needs to be adjusted in the process of generating the detection signals, such information is fed back to the MIMO transmitter.

According to the above-proposed embodiment, the MIMO transmitter adaptively determines the configuration of the RE group based on the channel correlation between the REs and inform the MIMO receiver of the configuration of the RE group. The MIMO receiver forms the RE groups based on the received information to processes the received signals, thereby omitting the process of forming the RE groups.

5. Apparatus Configuration

Figure 24:
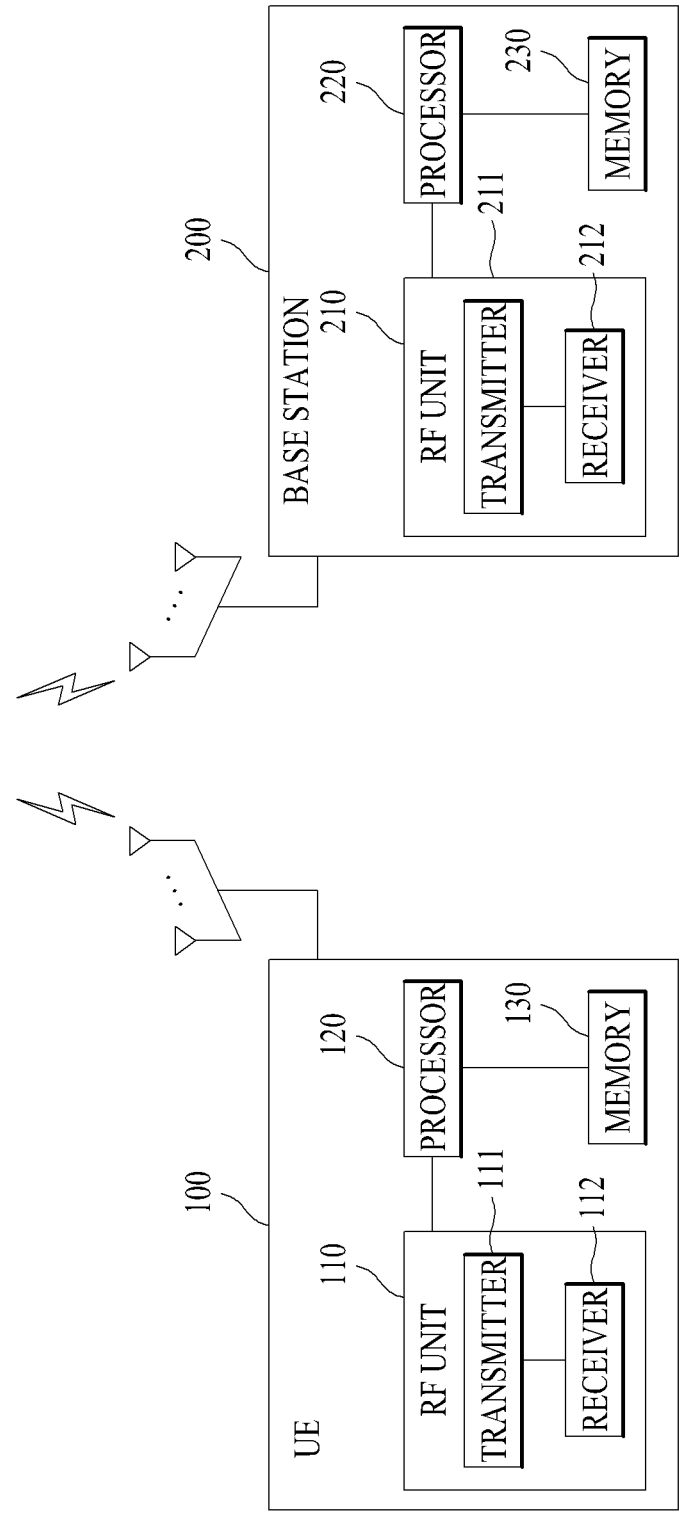
FIG. 24 is a block diagram showing the configuration of a UE and a base station according to one embodiment of the present invention.

FIG. 24 is a block diagram showing the configuration of a UE and a base station according to one embodiment of the present invention.

In FIG. 24, a UE 100 and the base station 200 may include radio frequency (RF) units 110 and 210, processors 120 and 220 and memories 130 and 230, respectively. Although a 1:1 communication environment between the UE 100 and the base station 200 is shown in FIG. 24, a communication environment may be established between a plurality of UEs and the base station 200. In addition, the base station 200 shown in FIG. 24 is applicable to a macro cell base station and a small cell base station.

The RF units 110 and 210 may include transmitters 112 and 212 and receivers 114 and 214, respectively. The transmitter 112 and the receiver 114 of the UE 100 are configured to transmit and receive signals to and from the base station 200 and other UEs and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the UE 100 may perform the methods of the various embodiments of the present invention.

The transmitter 212 and the receiver 214 of the base station 200 are configured to transmit and receive signals to and from another base station and the UEs and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the UE 100 and the base station 200 instruct (for example, control, adjust, or manage) the operations of the UE 100 and the base station 200, respectively. The processors 120 and 220 may be connected to the memories 130 and 180 for storing program code and data, respectively. The memories 130 and 180 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

The present invention can also be embodied as computer-readable code on a computer-readable recording medium. The computer-readable recording medium includes all data storage devices that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer readable code is stored and executed in a distributed fashion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of, at a multiple input multiple output (MIMO) transmitter including a plurality of antennas, performing communication with a MIMO receiver, the method comprising:

measuring correlation between channels of a plurality of resource elements (REs) based on channel information of the plurality of REs;

forming one or more RE groups by grouping the plurality of REs in consideration of the measured correlation between the channels; and transmitting information on the one or more RE groups and data through the plurality of REs to the MIMO receiver, wherein the data is detected by applying a reception filter and a preprocessing filter for each one of the one or more RE groups to one or more REs included in the one RE group, respectively.

2. The method according to claim 1, wherein the plurality of REs is arranged on a frequency axis and a time axis and configurations of the one or more RE groups are determined based on the number and shape of the plurality of REs.

3. The method according to claim 1, wherein the one or more RE groups are formed by comparing correlation between the channels of the plurality of REs computed along a frequency axis with a first threshold and comparing correlation between the channels of the plurality of REs computed on a time axis with a second threshold.

4. The method according to claim 1,
wherein the forming the one or more RE groups includes selecting any one of predetermined configurations of the one or more RE groups, and
wherein the transmitting includes transmitting an index value indicating the selected configuration of the one or more RE groups.

5. The method according to claim 1, wherein the transmitting includes transmitting an index value indicating a relation between the formed one or more RE groups and one or more previously formed RE groups.

6. The method according to claim 5, wherein the relation is information indicating that the one or more previously formed RE groups are maintained, enlarged, reduced or reset.

7. The method according to claim 1, wherein the information on the one or more RE groups is transmitted periodically, aperiodically or according to a request of the MIMO receiver, and
wherein, in a period in which the information on the one or more RE groups is not received, the MIMO receiver directly forms the one or more RE groups based on the channel information of the plurality of REs or continuously uses configurations of one or more previously formed RE groups.

8. The method according to claim 7, further comprising:
receiving, from the MIMO receiver, information indicating a result of, at the MIMO receiver, directly forming the one or more RE groups, and
forming one or more new RE groups based on the received information.

9. The method according to claim 1, further comprising transmitting a control frame indicating a time when the information on the one or more RE groups is transmitted,
wherein the information on the one or more RE groups is transmitted on the one or more RE groups at the time indicated in the control frame.

10. The method according to claim 1, wherein the reception filter and the preprocessing filter for the each one of the one or more RE groups is generated based on one RE included in the one RE group, respectively.

11. A multiple input multiple output (MIMO) transmitter including a plurality of antennas and configured to generate a signal to be transmitted through the plurality of antennas, the MIMO transmitter comprising:
a transmitter; and
a processor connected to the transmitter to generate the signal to be transmitted,
wherein the processor:
measures correlation between channels of a plurality of resource elements (REs) based on channel information of the plurality of REs,
forms one or more RE groups by grouping the plurality of REs in consideration of the measured correlation between the channels, and
controls the transmitter to transmit information on the one or more RE groups and data through the plurality of REs to a MIMO receiver, and
wherein the data is detected by applying a reception filter and a preprocessing filter for each one of the one or more RE groups to one or more REs included in the one RE group, respectively.

12. The MIMO transmitter according to claim 11, wherein the plurality of REs is arranged on a frequency axis and a time axis and configurations of the one or more RE groups are determined based on the number and shape of the plurality of REs.

13. The MIMO transmitter according to claim 11, wherein the processor forms the one or more RE groups by comparing correlation between the channels of the plurality of REs computed along a frequency axis with a first threshold and comparing correlation between the channels of the plurality of REs computed along a time axis with a second threshold.

14. The MIMO transmitter according to claim 11, wherein the processor selects any one of predetermined configurations of the one or more RE groups and controls the transmitter to transmit an index value indicating the selected configuration of the one or more RE groups.

15. The MIMO transmitter according to claim 11, wherein the processor controls the transmitter to transmit an index value indicating a relation between the formed one or more RE groups and one or more previously formed RE groups.

16. The MIMO transmitter according to claim 15, wherein the relation is information indicating that the one or more previously formed RE groups are maintained, enlarged, reduced or reset.

17. The MIMO transmitter according to claim 11, wherein:
the processor controls the transmitter to transmit the information on the one or more RE groups periodically, aperiodically or according to a request of the MIMO receiver, and
in a period in which the information on the RE groups is not received, the MIMO receiver directly forms the one or more RE groups based on the channel information of the plurality of REs or continuously uses configurations of one or more previously formed RE groups.

18. The MIMO transmitter according to claim 17, wherein the processor controls the receiver to receive, from the MIMO receiver, information indicating a result of, at the MIMO receiver, directly forming the one or more RE groups.

* * * * *